United States Patent
Zhang

(10) Patent No.: US 11,946,282 B1
(45) Date of Patent: Apr. 2, 2024

(54) MOVING DEVICES USED IN LIQUID AND POOL CLEANING ROBOTS

(71) Applicant: XINGMAI INNOVATION TECHNOLOGY (SUZHOU) CO., LTD., Jiangsu (CN)

(72) Inventor: Shilei Zhang, Suzhou (CN)

(73) Assignee: XINGMAI INNOVATION TECHNOLOGY (SUZHOU) CO., LTD., Suzhou (CN)

(*) Notice: Subject to any disclaimer, the term of this patent is extended or adjusted under 35 U.S.C. 154(b) by 0 days.

(21) Appl. No.: 18/353,263

(22) Filed: Jul. 17, 2023

Related U.S. Application Data

(63) Continuation of application No. PCT/CN2023/091116, filed on Apr. 27, 2023.

(51) Int. Cl.
*E04H 4/16* (2006.01)
*E04H 4/12* (2006.01)

(52) U.S. Cl.
CPC ......... *E04H 4/1654* (2013.01); *E04H 4/1263* (2013.01)

(58) Field of Classification Search
CPC ........ E04H 4/16; E04H 4/1636; E04H 4/1654
See application file for complete search history.

(56) References Cited

U.S. PATENT DOCUMENTS

| | | | |
|---|---|---|---|
| 2011/0049023 A1 | 3/2011 | Hui | |
| 2015/0259940 A1* | 9/2015 | Renaud | E04H 4/1672 15/1.7 |
| 2016/0348981 A1* | 12/2016 | Rodrick | E04H 4/14 |
| 2017/0362844 A1 | 12/2017 | Osuna et al. | |
| 2019/0161988 A1* | 5/2019 | Attar | G05D 1/0016 |
| 2020/0001723 A1* | 1/2020 | Durvasula | B60L 53/14 |

FOREIGN PATENT DOCUMENTS

| | | | | |
|---|---|---|---|---|
| CN | 104790696 A | 7/2015 | | |
| CN | 111155798 A | 5/2020 | | |
| CN | 111350383 A | 6/2020 | | |
| CN | 114059811 A | 2/2022 | | |
| CN | 114319955 A | 4/2022 | | |
| CN | 116006001 A | 4/2023 | | |
| EP | 3323963 A1 * | 5/2018 | ........... | E04H 4/1263 |

* cited by examiner

*Primary Examiner* — Michael D Jennings
(74) *Attorney, Agent, or Firm* — METIS IP LLC

(57) ABSTRACT

The present disclosure provides a moving device used in liquid. The moving device includes a mode switching member configured to achieve a position switching of the moving device above a liquid surface and below the liquid surface. When the moving device is below the liquid surface, the moving device is fully submerged below the liquid surface, and when the moving device is above the liquid surface, at least a portion of the moving device is above the liquid surface.

20 Claims, 14 Drawing Sheets

US 11,946,282 B1

MOVING DEVICES USED IN LIQUID AND POOL CLEANING ROBOTS

CROSS-REFERENCE TO RELATED APPLICATIONS

This application is a Continuation of International Application No. PCT/CN2023/091116, filed on Apr. 27, 2023, the contents of which are hereby incorporated by reference in their entirety.

TECHNICAL FIELD

The present disclosure relates to the field of water cleaning, and in particular, to a moving device used in liquid and a pool cleaning robot.

BACKGROUND

Cleaning and maintenance of a pool is essential to keep the water clean and the pool sanitary. Pool cleaning robots on the market can be divided into three types. The first type of cleaning robot can only clean the bottom of the water. The second type of cleaning robot can clean both the bottom and the vertical wall surface but shall be below the surface of the water. The third type of cleaning robot needs to be floating on the surface of the water, and can only clean the surface of the water. Each of the three types of pool cleaning robots has its own characteristics, but they all lack effective position adjustment in the liquid environment and cannot adjust the depth according to the actual need for all-round cleaning of the bottom, wall surface and water surface of the pool, which limits their application scope and work efficiency.

Therefore, it is desirable to provide a moving device used in liquid and a pool cleaning robot that can flexibly switch positions between above and below the liquid surface to improve the efficiency and application range of water body cleaning in water and reduce cleaning costs.

SUMMARY

One embodiment of the present disclosure provides a moving device used in liquid. The moving device includes: a mode switching member configured to achieve a position switching of the moving device above a liquid surface and below the liquid surface. When the moving device is below the liquid surface, the moving device is fully submerged below the liquid surface, and when the moving device is above the liquid surface, at least a portion of the moving device is above the liquid surface. One embodiment of the present disclosure provides a pool cleaning robot. The pool cleaning robot includes a dust box including a dust box opening configured to clean liquid that enters the dust box; a moving device as described in the above embodiment; and a control member configured to control the pool cleaning robot to perform a water surface cleaning of a pool or an underwater cleaning of the pool.

One embodiment of the present disclosure provides a liquid cleaning control method. The liquid cleaning control method is applied to a pool cleaning robot as described in the above embodiment, and performed by a control member. The liquid cleaning control method includes obtaining a target task for cleaning a target pool, wherein the target task includes a water surface cleaning and/or an underwater cleaning; determining an adjustment parameter of the moving device based on the target task and a current position of the pool cleaning robot; and controlling, based on the adjustment parameter, the moving device to drive the pool cleaning robot to move to a target position to accomplish the target task.

BRIEF DESCRIPTION OF THE DRAWINGS

The present disclosure is further described in terms of exemplary embodiments. These exemplary embodiments are described in detail with reference to the drawings. These embodiments are not limiting, and in these embodiments the same numbering indicates the same structure where.

Figure 1:
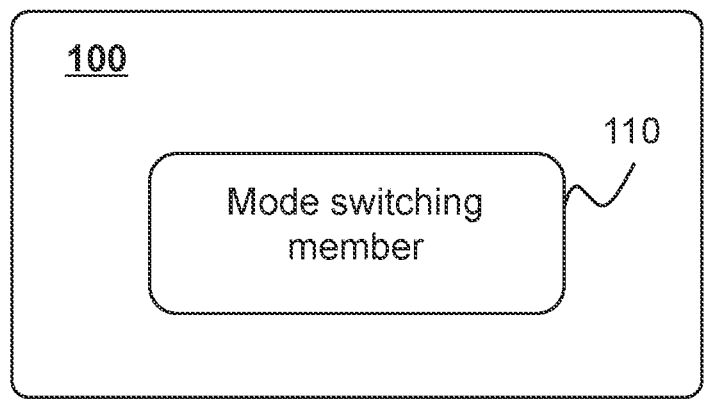
FIG. 1 is a block diagram illustrating an exemplary moving device used in liquid according to some embodiments of the present disclosure.

Description of the attached markings: 100, moving device; 110, mode switching member; 111, buoyancy force adjustment assembly; 1111, buoyancy cavity; 1112, buoyancy cavity pump; 1113, air inlet; 1114, connection pipeline; 112, first propeller; 1121, impeller; 1122, motor assembly; 1123, opening; 120, second propeller; 130, track; 140, main water pump; 141, main water pump inlet; 142, main water pump outlet; 200, liquid surface; 300, target region; 310, bottom wall; 320, side wall; 400, pool cleaning robot; 410, dust box; 411, water surface dust box opening; 412, in-water dust box opening; 413, dust box roller brush assembly; 414, cover plate of the water surface dust box opening; 415, cover plate of the in-water dust box opening; 420, trash guiding member; 421, first end; 422, second end; 430, main roller brush.

DETAILED DESCRIPTION

In order to more clearly illustrate technical solutions of the embodiments of the present disclosure, the following briefly introduces the drawings that need to be used in the description of the embodiments. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the words may be replaced by other expressions if other words can achieve the same purpose.

As shown in the present disclosure and the claims, unless the context clearly suggests exceptional circumstances, the words "a," "an," and/or "the" do not specifically refer to the singular, but may also include the plural. In general, the terms "comprise," "comprises," "comprising," "include," "includes," and/or "including" merely prompt to include operations and elements that have been clearly identified, and these operations and elements do not constitute an exclusive listing. The methods or devices may also include other operations or elements.

The flowchart is used in the present disclosure to illustrate operations performed by the system according to the embodiment of the present disclosure. It should be understood that the foregoing or following operations may be not necessarily performed exactly in order. Instead, the operations may be processed in opposite order or simultaneously. At the same time, other operations may be added to these procedures, or a certain step or steps may be removed from these procedures.

The pool cleaning robots on the market all lack effective position adjustment in the liquid environment and are unable to adjust the depth to the actual need for all-round cleaning of the bottom, wall surface and water surface of the pool, limiting their application scope and efficiency. Some embodiments of the present disclosure provide a moving device used in liquid that can flexibly switch positions between above the liquid surface and below the liquid surface, thereby enabling a pool cleaning robot incorporating the aforementioned moving device to clean the pool in all directions, improving the efficiency and application of water body cleaning in the pool, and reducing the cost of cleaning the pool.

FIG. 1 is a block diagram illustrating an exemplary moving device used in liquid according to some embodiments of the present disclosure.

A moving device 100 may be configured to move in a target region 300 containing liquid and may switch a position above a liquid surface and below the liquid surface. The target region 300 may be a region containing the liquid in which the moving device 100 performs its movement. The target region 300 may include a pool. For example, the moving device 100 may move in a water body of the pool and switch a position on a water surface of the pool and in the water of the pool. In some embodiments, the target region 300 may also be other regions. For example, the target region 300 may also include an oil well, a sewer, etc. The target region 300 may include a bottom wall 310 and a side wall 320. In some embodiments, the moving device 100 may also move on the bottom wall 310 of the target region 300 and on the side wall 320 of the target region 300. For example, the moving device 100 may move on the bottom wall 310 of the pool and on the side wall 320 of the pool. For more information about the movement of the moving device 100 on the bottom wall 310 of the target region 300 and on the side wall 320 of the target region 300, please refer to the following part of the present disclosure.

In some embodiments, the moving device 100 may include a mode switching member 110. The mode switching member 110 may be configured to achieve a position switching of the moving device 100 above the liquid surface and below the liquid surface. The mode switching member 110 may move in a vertical direction of the target region 300, thus enabling the position switching of the moving device 100 above the liquid surface and below the liquid surface. When the moving device 100 is below the liquid surface 200, all of the moving device 100 is submerged below the liquid surface 200, and when the moving device 100 is above the liquid surface 200, at least a portion of the moving device 100 is above the liquid surface 200.

In some embodiments, the mode switching member 110 may adjust an action force received by the moving device 100 in the vertical direction to move the moving device 100 in the vertical direction, thereby enabling the position switching of the moving device 100 above the liquid surface and below the liquid surface. The aforementioned vertical direction may be the vertical direction of the target region 300. For example, the vertical direction of the target is the vertical direction of the pool, i.e., the gravity direction. A horizontal direction may be a horizontal direction of the target region 300, e.g., the horizontal direction of the pool (i.e., the direction perpendicular to the gravity direction).

In some embodiments of the present disclosure, by providing the mode switching member 110, the moving device 100 may achieve the position switching above the liquid surface and below the liquid surface so that the moving device 100 may adjust its position above the liquid surface and below the liquid surface according to different liquid environments and needs, and be able to perform corresponding operations in different positions in the liquid more flexibly.

In some embodiments, the action force received by the moving device 100 in the vertical direction may include a buoyancy force to which the moving device 100 is subjected in the vertical direction.

When the aforementioned action force includes a buoyancy force to which the moving device 100 is subjected in the vertical direction, the mode switching member 110 may include a buoyancy force adjustment assembly 111. The buoyancy force adjustment assembly 111 may be configured to adjust the magnitude of the buoyancy force to which the moving device 100 is subjected in the vertical direction. In some embodiments, the buoyancy force adjustment assembly 111 may include a buoyancy cavity 1111 and a buoyancy force adjustment member.

Figure 3:
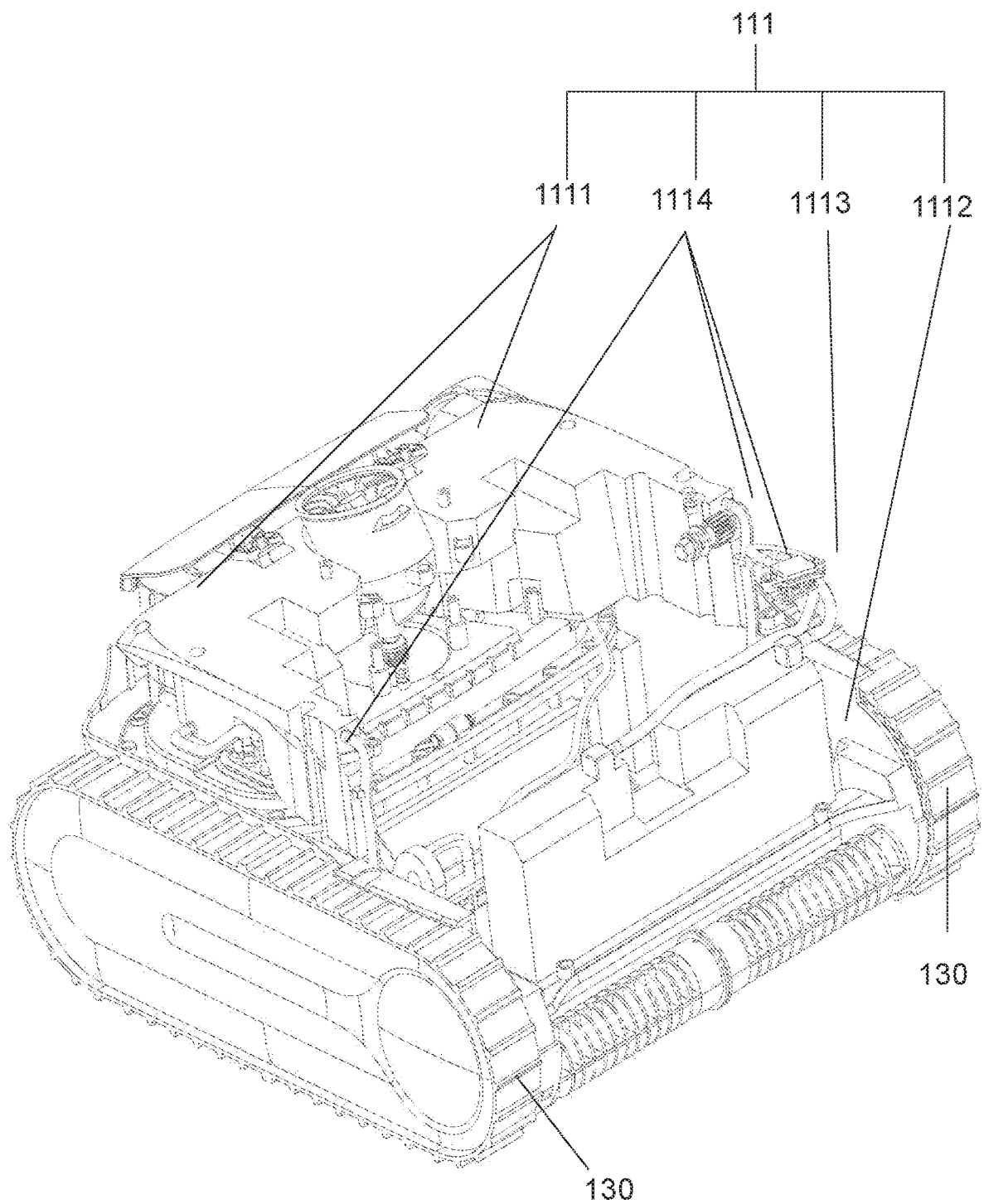
FIG. 3 is a schematic diagram illustrating a portion of a structure of an exemplary moving device used in liquid according to some embodiments of the present disclosure.

The buoyancy cavity 1111 may be configured to accommodate liquid and/or gas. The buoyancy cavity 1111 may also include, but is not limited to, an inflatable buoyancy cavity, a liquid container type buoyancy cavity, a separated buoyancy cavity, etc. A volume of the buoyancy cavity 1111 may be preset. The buoyancy cavity 1111 may be made of a flexible material and/or a rigid material. The aforementioned flexible material may include, but is not limited to, polyvinyl alcohol resin, polyethylene terephthalate, rubber, etc. The rigid material may include but is not limited to, glass, ceramics, phenolic plastics, polyurethane plastics, epoxy plastics, unsaturated polyester plastics, etc. For example, the buoyancy cavity 1111 may include a double structured buoyancy cavity containing an inner layer and an outer layer. The inner layer may be made of a flexible material for loading gas and/or liquid, and the outer layer may be a rigid protective housing that provides protection and stability for the inner layer. In some embodiments, the buoyancy cavity 1111 may be provided at a front end and/or a rear end of the moving device 100. As used herein, the front end and the rear end of the moving device 100 refer to two ends of the moving device 100 along a moving direction of the moving device 100 respectively, and a direction from the rear end to the front end is consistent with the moving direction of the moving device 100. In some embodiments, the moving device 100 may include a buoyancy cavity 1111 within the moving device 100. When there is only one buoyancy cavity 1111 within the moving device 100, the buoyancy cavity 1111 may be provided in a center position of the moving device 100 to keep the moving device 100 stable when the volume of liquid and/or gas in that buoyancy cavity 1111 changes. In some embodiments, the moving device 100 may include multiple buoyancy cavities 1111 within the moving device 100. As shown in FIG. 3, the moving device 100 may have two buoyancy cavities 1111 within the moving device 100, and the two buoyancy cavities 1111 may be provided symmetrically on each of a left side and a right side of the front end of the moving device 100. As used herein, the left side and the right side of the front end of the moving device 100 refer to the left side and the right side of the front end along the moving direction of the moving device 100 respectively. It can be understood that the symmetrical setting of the two buoyancy cavities 1111 contributes to their stability when providing a buoyancy force to the moving device 100, avoiding the phenomenon of the moving device 100 tipping and deflecting under or on the liquid surface due to the uneven buoyancy force.

It should be noted that a size and a position of the buoyancy cavity 1111 may be adjusted according to a weight and a position of each member of the moving device 100, to ensure that the moving device 100 is in a preset state of the moving device 100 when the volume of liquid and/or gas contained therein is different.

The buoyancy force adjustment member may be configured to adjust the volume of gas in the buoyancy cavity 1111. The volume of the gas in the buoyancy cavity 1111 may be adjusted by the buoyancy force adjustment member of the moving device 100 to change a magnitude of the buoyancy force on the moving device 100 in the vertical direction. For example, when the buoyancy cavity 1111 made of a flexible material is deflated, the buoyancy force adjustment member may inject air into the buoyancy cavity 1111 through an air inlet 1113, thereby increasing the volume of the gas in the buoyancy cavity 1111 and increasing the magnitude of the buoyancy force to which the moving device 100 is subjected in the vertical direction. It can be understood that the moving device 100 as a whole is subjected to an upward buoyancy force in the vertical direction that is positively correlated with the volume of the gas in the buoyancy cavity 1111. The buoyancy force adjustment member may also be configured to adjust the volume of liquid in the buoyancy cavity 1111. The moving device 100 may adjust the volume of the liquid in the buoyancy cavity 1111 by the buoyancy force adjustment member to adjust the volume of the gas in the buoyancy cavity 1111, thereby changing the magnitude of the buoyancy force to which the moving device 100 is subjected in the liquid. For example, when the buoyancy cavity 1111 made of a rigid material contains liquid, the buoyancy force adjustment member may pump out the liquid in the buoyancy cavity 1111 and the gas may enter the buoyancy cavity 1111 through the air inlet 1113, thereby increasing the volume of the gas in the buoyancy cavity 1111 and increasing the magnitude of the buoyancy force to which the moving device 100 is subjected in the vertical direction. It can be understood that the moving device 100 as a whole is subjected to the upward buoyancy force in the vertical direction negatively correlated with the volume of the liquid in the buoyancy cavity 1111.

The buoyancy force adjustment member may be any structure that can adjust gas in the buoyancy cavity 1111. As shown in FIG. 3, the buoyancy force adjustment member may include a buoyancy cavity pump 1112. The buoyancy cavity pump 1112 may drive the buoyancy cavity 1111 to discharge the liquid therein. The buoyancy cavity pump 1112 may include, but is not limited to, a pneumatic pump, a hydraulic pump, an electric pump, etc. The buoyancy force adjustment member may also be other structures. For example, the buoyancy force adjustment member may also be a piston assembly provided inside the buoyancy cavity 1111, and the volume of gas and/or liquid inside the buoyancy cavity 1111 can be adjusted by a movement of the piston assembly inside the buoyancy cavity 1111.

Figure 2:
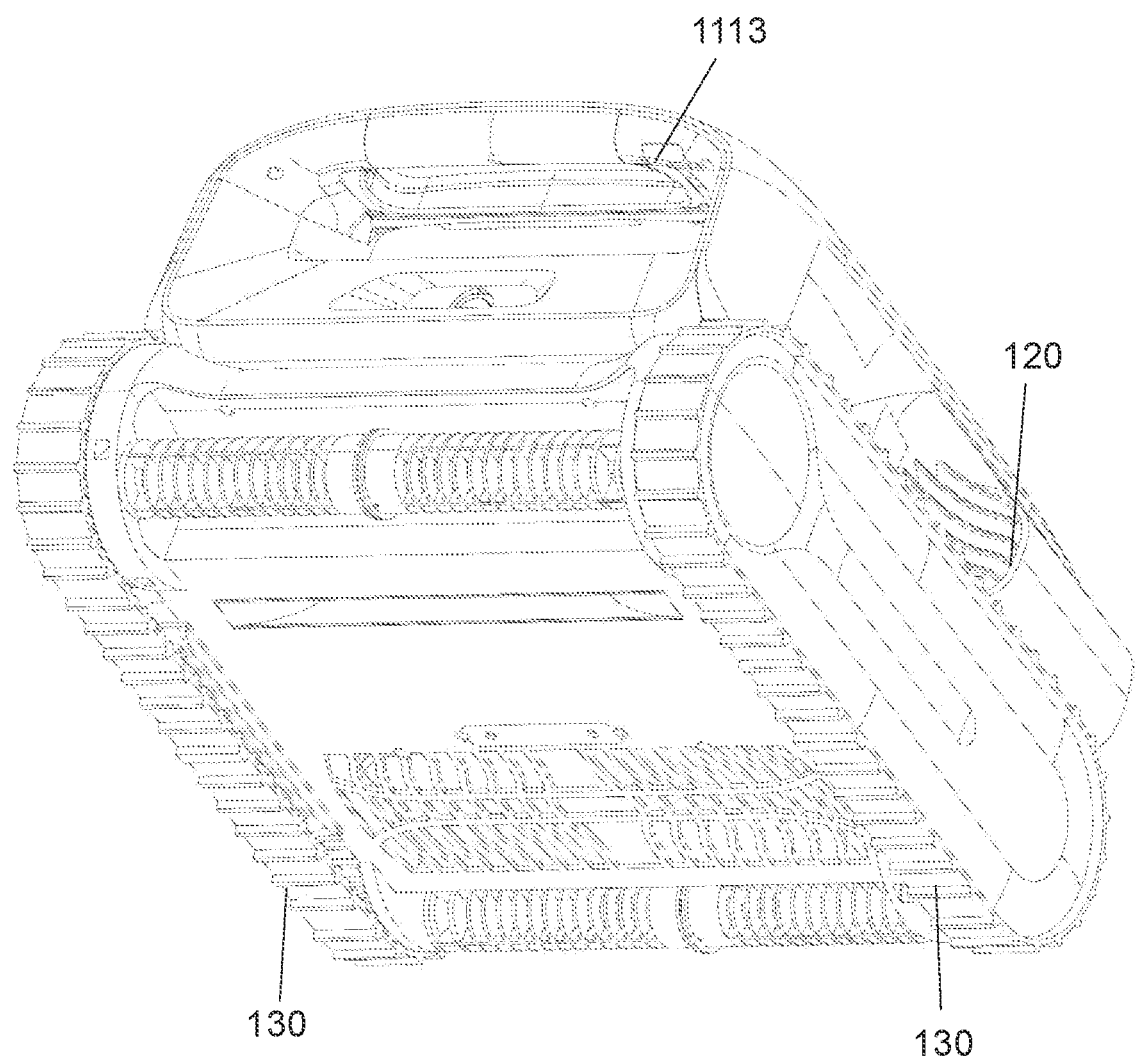
FIG. 2 is a schematic diagram illustrating an exemplary moving device used in liquid according to some embodiments of the present disclosure.

In some embodiments, the buoyancy force adjustment assembly 111 may also include an air inlet 1113. The aforementioned air inlet 1113 is configured to supply gas into the buoyancy cavity 1111. In some embodiments, the aforementioned air inlet 1113 may also be configured for the gas to leave the buoyancy cavity 1111, or for the liquid to enter or leave the buoyancy cavity 1111. In some embodiments, the buoyancy force adjustment assembly 111 may also include other inlets and outlets for the exit of the gas or the entry or exit of the liquid. The air inlet 1113 may be provided directly on the buoyancy cavity 1111 or may also be independent of the buoyancy cavity 1111. The air inlet 1113 may be provided on a housing of the moving device 100 to facilitate connection to an external (e.g., external liquid or external air) for the exchange of gas and/or liquid. As shown in FIG. 2, the air inlet 1113 may be provided at a point above an end of a front section of the moving device 100, so that the air inlet 1113 can connect the external air on the liquid surface more quickly during the uplifting of the moving device 100.

In some embodiments, the buoyancy force adjustment assembly 111 may also include a connection pipeline 1114. The connection pipeline 1114 is configured to transport gas or liquid. The connection pipeline 1114 may connect one or more of the buoyancy cavity 1111, the buoyancy force adjustment member, and the air inlet 1113. As shown in FIG. 3, the moving device 100 may include two buoyancy cavities 1111, the buoyancy cavity pump 1112, the air inlet 1113, and the connection pipeline 1114. The buoyancy cavity 1111 may be connected to the buoyancy cavity pump 1112 through the connection pipeline 1114, and the buoyancy cavity pump 1112 may be connected to the air inlet 1113 through the connection pipeline 1114.

Figure 4A:
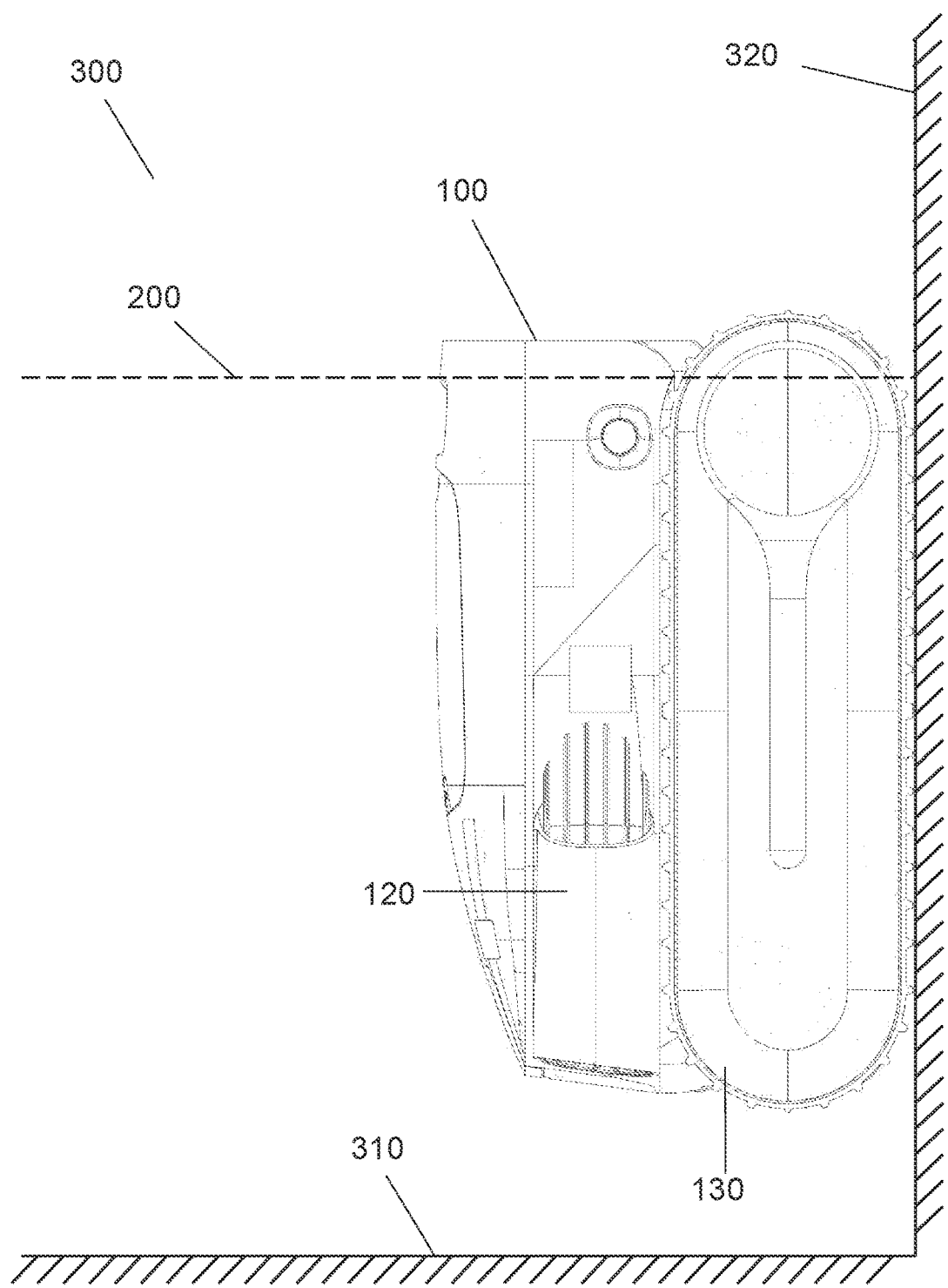
FIG. 4A is a schematic diagram illustrating an exemplary moving device used in liquid that is moving on a side wall of a target region according to some embodiments of the present disclosure.

Based on the moving device 100 as shown in FIGS. 2 and 3, when the moving device 100 needs to be switched from below the liquid surface to above the liquid surface, the moving device 100 may move to a position close to the liquid surface 200 and determine when to control the buoyancy cavity pump 1112 to inject gas into the buoyancy cavity 1111. For more information about when the moving device 100 needs to be switched from below the liquid surface to above the liquid surface, please refer to FIG. 10 and its related description. As shown in FIG. 4A, when the moving device 100 needs to be switched from below the liquid surface to above the liquid surface, the moving device 100 may move against the side wall 320 of the target region 300 to a position close to the liquid surface 200 and determine when it is necessary to control the buoyancy force adjustment member to increase the volume of gas in the buoyancy cavity 1111. For more information about the movement of the moving device 100 against the side wall 320 of the target region 300, please refer to the following part of the present disclosure. In some embodiments, when the moving device 100 needs to be switched from below the liquid surface to above the liquid surface, the moving device 100 may also move to a position close to the liquid surface 200 based on a first drive force generated by a first propeller 112 and determine when the buoyancy force adjustment member needs to be controlled to increase the volume of gas in the buoyancy cavity. For more information about the first propeller 112 and the first drive force, please refer to the following part of the present disclosure.

In some embodiments, the moving device 100 may include a first sensor (not shown). The first sensor may be configured to determine the position of the moving device 100 in real time. The aforementioned position may include a vertical position (or depth) of the moving device 100 in the liquid. For example, the first sensor may be provided at a central position of the moving device, and the aforementioned position may be a depth of the central position of the moving device 100 in the liquid. The first sensor may include, but is not limited to, a pressure sensor, an ultrasonic sensor, an optical sensor, etc.

Figure 4B:
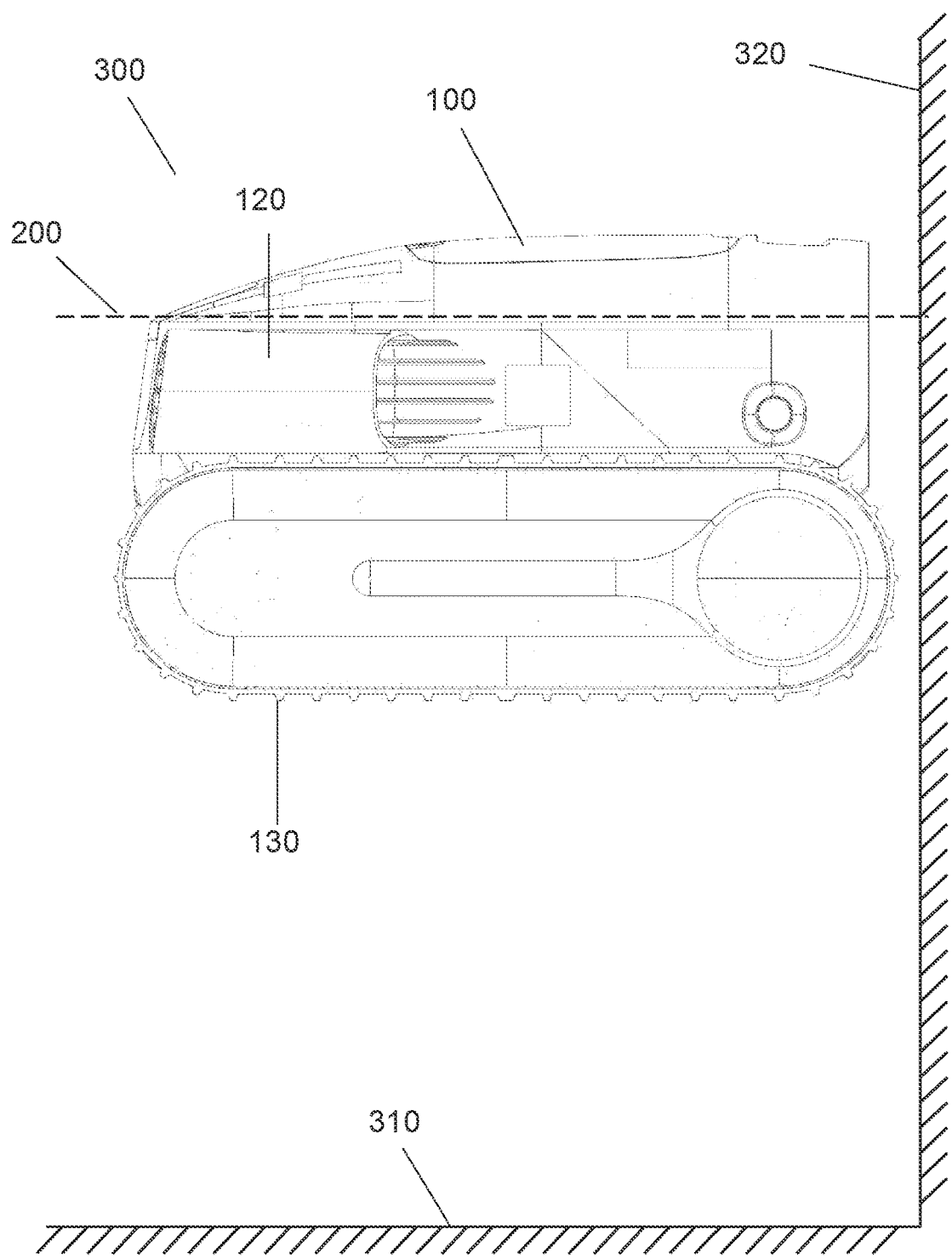
FIG. 4B is a schematic diagram illustrating an exemplary moving device used in liquid that is floating on a liquid surface according to some embodiments of the present disclosure.

In some embodiments, the moving device 100 may also include a processor (not shown). The processor may be a microcontroller, an embedded processor, or an application-specific integrated circuit (ASIC), etc. The processor may obtain various data information of the moving device 100 and analyze and process the data information to control the various components in the moving device 100. When the moving device 100 needs to be switched from below the liquid surface to above the liquid surface, the processor may obtain the position of the moving device 100 in real time from the first sensor, and when the position of the moving device 100 meets a preset condition, the processor may control the buoyancy force adjustment member to increase the volume of the gas in the buoyancy cavity 1111. The preset condition may include a position of the moving device 100 above a preset height. When the depth of the liquid in the target region 300 is fixed, the processor may determine whether the air inlet 1113 in the moving device 100 is above the liquid surface 200 by determining whether the position of the moving device 100 meets the preset condition. When the position of the moving device 100 shown in FIG. 4A meets the preset condition, the processor may determine that the air inlet 1113 on the moving device 100 is above the liquid surface 200, and the processor may control the buoyancy cavity pump 1112 to discharge the liquid in the buoyancy cavity 1111, and the air may enter the buoyancy cavity 1111 through the air inlet 1113, so that the volume of the gas in the buoyancy cavity 1111 can be increased and the buoyancy force of the moving device 100 can be increased. When the buoyancy force of the moving device 100 in the vertical direction is greater than the gravity of the moving device 100, the moving device 100 as shown in FIG. 4A may be switched to the moving device 100 as shown in FIG. 4B.

In some embodiments, the moving device 100 may also include a second sensor (not shown). The second sensor may be configured to detect in real time whether the air inlet of the buoyancy cavity 1111 is positioned in air. For example, the second sensor may include an ultrasonic sensor. The second sensor may be provided at the position of the air inlet of the buoyancy cavity 1111. In some embodiments, the second sensor may also be provided at other positions of the moving device 100 and obtain a detection result of whether the air inlet is located in the air by a position transition. In some embodiments, when the moving device 100 needs to be switched from below the liquid surface to above the liquid surface, the processor may obtain a detection result of whether the air inlet of the buoyancy cavity 1111 is located in the air, and when the detection result characterizes that the aforementioned air inlet is located in the air, the buoyancy force adjustment member is controlled to increase the volume of the gas in the buoyancy cavity 1111 to achieve the switching of the moving device 100 from below the liquid surface to above the liquid surface. For more information about the processor controlling the buoyancy force adjustment member to increase the volume of gas in the buoyancy cavity 1111 to enable the moving device 100 to be switched from below the liquid surface to above the liquid surface, please refer to the above section of the present disclosure.

When the moving device 100 needs to be switched from above the liquid surface to below the liquid surface, the processor may control the buoyancy force adjustment member to reduce the volume of gas in the buoyancy cavity 1111. For more information about when the moving device 100 needs to be switched from above the liquid surface to below the liquid surface, please refer to FIG. 10 and its related description. As shown in FIGS. 2 and 3, the processor may discharge gas from the buoyancy cavity 1111 via the connection pipeline 1114, thereby reducing the volume of the gas in the buoyancy cavity 1111 to reduce the buoyancy force to allow the moving device 100 to be switched from above the liquid surface to below the liquid surface.

In some embodiments of the present disclosure, the buoyancy force adjustment component 111 may be provided to adjust the magnitude of the buoyancy force to which the moving device 100 is subjected in the vertical direction, thereby achieving flexible switching of the moving device 100 above the liquid surface and below the liquid surface, and improving the efficiency and reliability of the moving device 100 in the liquid environment. By providing the first sensor or the second sensor, the moving device 100 can automatically determine the environment in which the air inlet 1113 is located, which improves the efficiency of the use of the moving device 100.

In some embodiments, the mode switching member 110 may also include a power adjustment assembly. The power adjustment assembly may be configured to adjust the first drive force to which the moving device 100 is subjected in the vertical direction. The power adjustment assembly may be a variety of structures that can provide the first drive force. For example, the power adjustment assembly may include a propeller, and the aforementioned propeller may be provided vertically on the moving device 100, and by rotating the aforementioned propeller, the moving device 100 may be made to obtain the first drive force in the vertical direction. The first drive force in the vertical direction may be upward or downward, and under the action of the first drive force, the moving device 100 may move upward or downward in the vertical direction, or be suspended in a certain position in the liquid.

Figure 5:
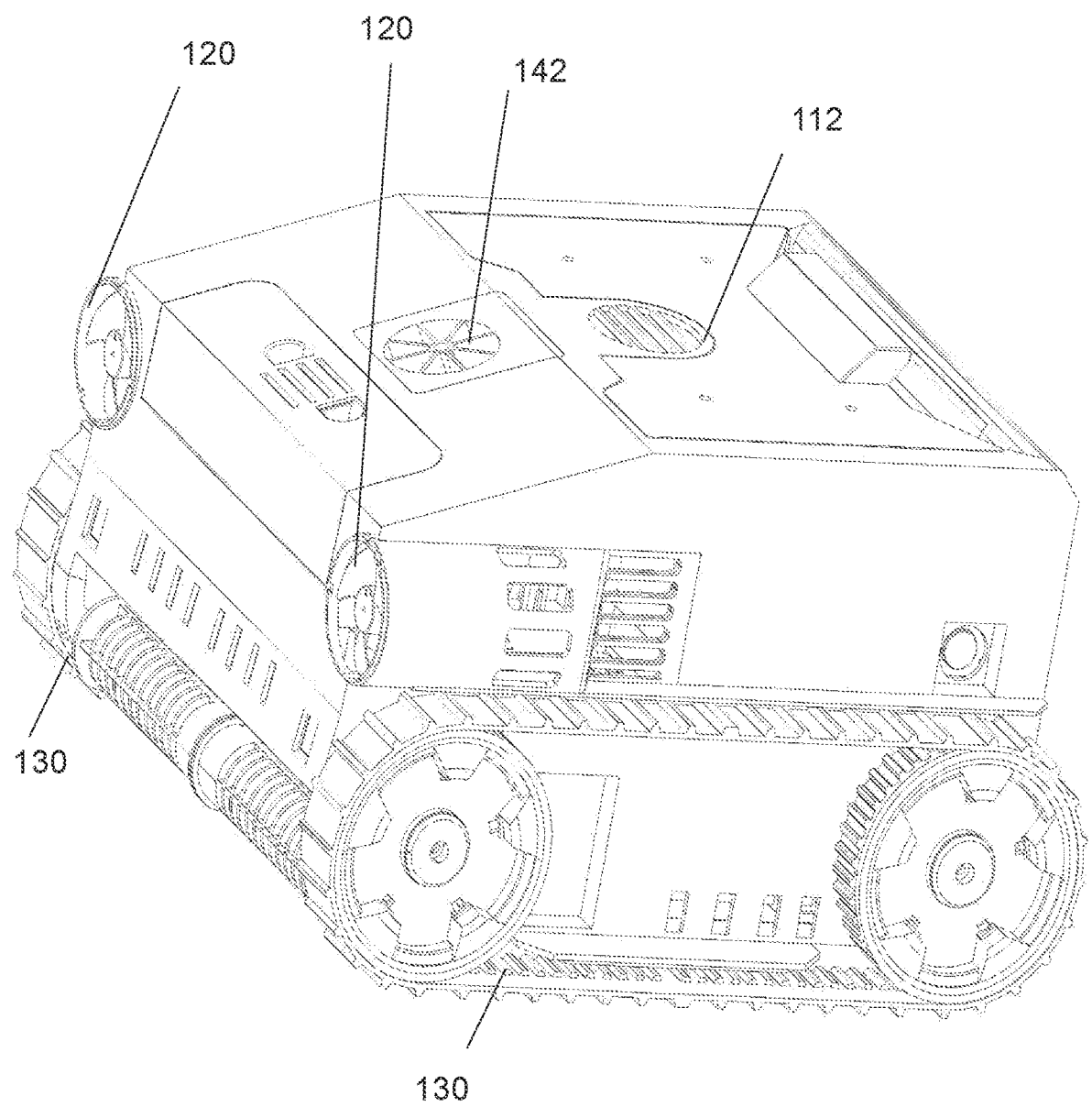
FIG. 5 is a schematic diagram illustrating another exemplary moving device used in liquid according to some embodiments of the present disclosure.

In some embodiments, as shown in FIG. 5, the power adjustment assembly may include the first propeller 112. The first propeller 112 may be configured to propel the liquid in a first preset direction. The first preset direction may be a direction in which the first propeller 112 discharges the liquid. When the first propeller 112 propels the liquid in the first preset direction, the moving device 100 may be subjected to a reaction force opposite to the first preset direction, and the aforementioned reaction force may include the first drive force. It should be understood that since the moving device 100 needs to obtain the first drive force in the vertical direction, the first preset direction includes at least an inclination in the vertical direction to ensure that the obtained reaction force as mentioned before has a division force in the vertical direction (i.e., the first drive force). Accordingly, an angle between the first preset direction and the vertical direction may be [0°, 90°).

The magnitude of the first drive force may be positively correlated with the speed of the liquid moving along the first preset direction. The greater the speed of the liquid moving in the first preset direction is, the greater the reaction force on the moving device 100 opposite to the first preset direction is, and the greater the first drive force in the vertical direction is.

Figure 7A:
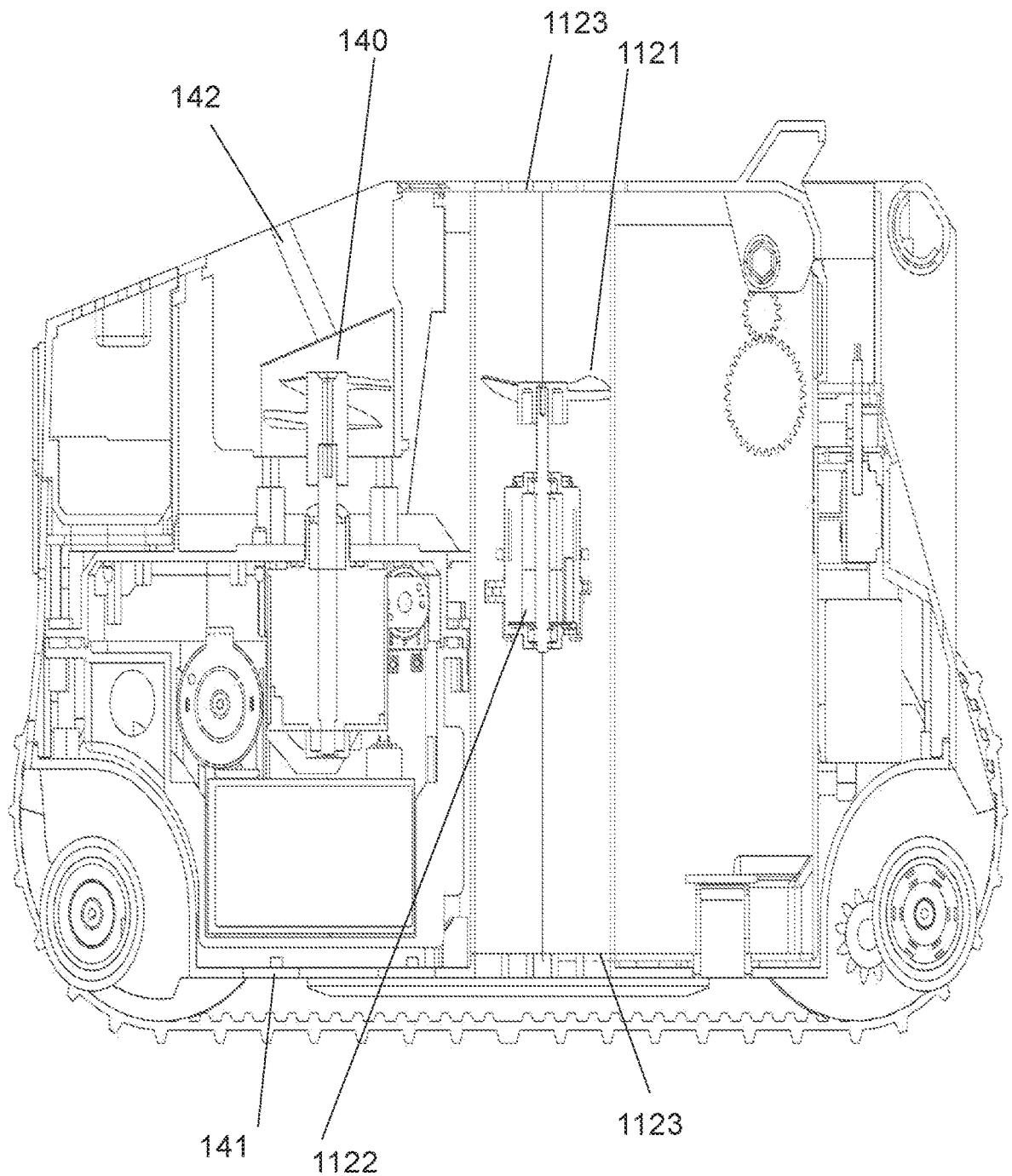
FIG. 7A is a schematic diagram illustrating a cross-sectional view of another exemplary moving device used in liquid according to some embodiments of the present disclosure.

The magnitude of the first drive force may also be negatively correlated with the angle between the first preset direction and the vertical direction. When the liquid moves along the first preset direction with the same speed, the greater the angle between the first preset direction and the vertical direction is, the smaller the first drive force of the moving device 100 in the vertical direction is. As shown in FIG. 7A, when the angle between the first preset direction and the vertical direction is 0°, the aforementioned reaction force on the moving device 100 may be completely converted to the first drive force in the vertical direction.

The moving device 100 may include one or more first propellers 112. The first propeller 112 may be provided at various positions in the moving device 100. As shown in FIG. 5 and FIG. 7A, the first propeller 112 may be vertically provided in the central position of the moving device 100 to ensure the balance during the movement of the moving device 100. The first propeller 112 may include an impeller 1121 and a motor assembly 1122. The impeller 1121 may drive the liquid in the first preset direction by rotation, and when the liquid moves in the first preset direction, the moving device 100 is subjected to the first drive force in the vertical direction. The motor assembly 1122 may power the aforementioned impeller 1121. As shown in FIG. 7A, the first propeller 112 in the moving device 100 may include two openings 1123. One opening 1123 of the first propeller 112 may be located at a top of the moving device 100, and another opening 1123 of the first propeller 112 may be located at a bottom of the moving device 100. As used herein, the bottom of the moving device 100 refer refers to an end of the moving device 100 close to the bottom of the pool; and the top of the moving device 100 refers to an end of the moving device opposite to the bottom of the moving device 100. The impeller 1121 may be driven by the motor assembly 1122 to absorb the liquid from one of the two openings 1123 and discharge the liquid from the other opening 1123, thereby giving the moving device 100 the first drive force in the vertical direction. When the moving device 100 is located in the liquid, the moving device 100 may also adjust the rotation direction of the impeller 1121 (e.g., forward rotation, counter rotation) to adjust the first preset direction, thereby adjusting the direction of the first drive force, so that the position of the moving device 100 above the liquid surface and below the liquid surface may be switched.

Some embodiments of the present disclosure, by providing the first propeller 112, can make it possible for the moving device 100 to quickly and easily switch the position of the moving device 100 above the liquid surface and below the liquid surface.

In some embodiments, the moving device 100 may also move in a horizontal direction of the target region 300. As shown in FIG. 2 and FIG. 5, the moving device 100 may also include a second propeller 120. The second propeller 120 may propel the liquid in a second preset direction to generate a second drive force in the horizontal direction. The moving device 100 may achieve a movement in the horizontal direction under the action of the second drive force. The second preset direction may include a direction in which the second propeller 120 discharges the liquid. Similarly to the first propeller 112, since the moving device 100 needs to obtain the second drive force in the horizontal direction, the second preset direction includes at least an inclination in the horizontal direction to ensure that the obtained reaction force as mentioned before has a division force in the horizontal direction (i.e., the second drive force). Accordingly, an angle between the second preset direction and the horizontal direction may [0°, −90°).

Similar to the first propeller 112, the magnitude of the second drive force may be positively correlated with a speed of the liquid moving in the second preset direction. The greater the speed of the liquid moving in the second preset direction is, the greater the reaction force on the moving device 100 opposite to the second preset direction is, and the greater the second drive force in the horizontal direction is. The magnitude of the second drive force may also be negatively correlated with the angle between the second preset direction and the horizontal direction. The greater the angle between the second preset direction and the horizontal direction is, the smaller the second drive force of the moving device 100 in the horizontal direction is when the liquid is moving at the same speed along the second preset direction. As shown in FIG. 7A, when the angle between the second preset direction and the horizontal direction is 0°, the aforementioned reaction force on the moving device 100 may completely switch the second drive force on the moving device 100 in the horizontal direction.

Similar to the first propeller 112, the second propeller 120 may include an impeller and a motor assembly. For more information about the impeller and the motor assembly, please refer to the above section of the present disclosure.

The moving device 100 may include one or more second propellers 120. The second propeller 120 may be provided at a bottom of the moving device 100. For example, when only one second propeller 120 is included in the moving device 100, the second propeller 120 may be provided horizontally at a central position at the bottom of the moving device 100 to ensure the balance of the moving device 100. In some embodiments, the second propeller 120 may also be provided on a side of the moving device 100. It should be noted that when the second propeller 120 is provided on the side of the moving device 100, its setting position should be at least partially below a floating position of the moving device 100 on the liquid surface to ensure that when the moving device 100 is floating on the liquid surface, the impeller rotation in the second propeller 120 can propel the liquid in the second preset direction, to provide the second drive force in the horizontal direction for the moving device 100. In some embodiments, when the second propeller 120 is provided on the side of the moving device 100, the setting position of the second propeller 120 may be all below the floating position of the moving device 100 on the liquid surface. In some embodiments, at least one second propeller 120 may be provided on each of a left side and a right side of the moving device 100. As shown in FIG. 5, one second propeller 120 may be provided on each of the left and right side of the moving device 100. When the moving device 100 moves in the liquid, the moving device 100 may adjust the power of the motor assembly of each of the second propellers 120 on the left side and the right side, respectively, to adjust a movement speed of each of the second propellers 120 on the left side and the right side to push the liquid along the second preset direction, to achieve a turn of the moving device 100. For example, when the movement speed of the second propeller 120 on the left side propelling the liquid in the second preset direction is greater than the movement speed of the second propeller 120 on the right side propelling the liquid in the second preset direction, the moving device 100 may turn toward the right side under the action of the second propeller 120 on the left side.

In some embodiments of the present disclosure, by providing the second propeller 120, it is possible to switch the position of the moving device 100 in the horizontal direction, for example, to go straight or turn in the horizontal direction, so that the function of the moving device 100 can be expanded to make it suitable for more use scenarios.

In some embodiments, the moving device 100 may also include a track 130. The operation of the track 130 may drive the movement of the moving device 100.

Figure 6A:
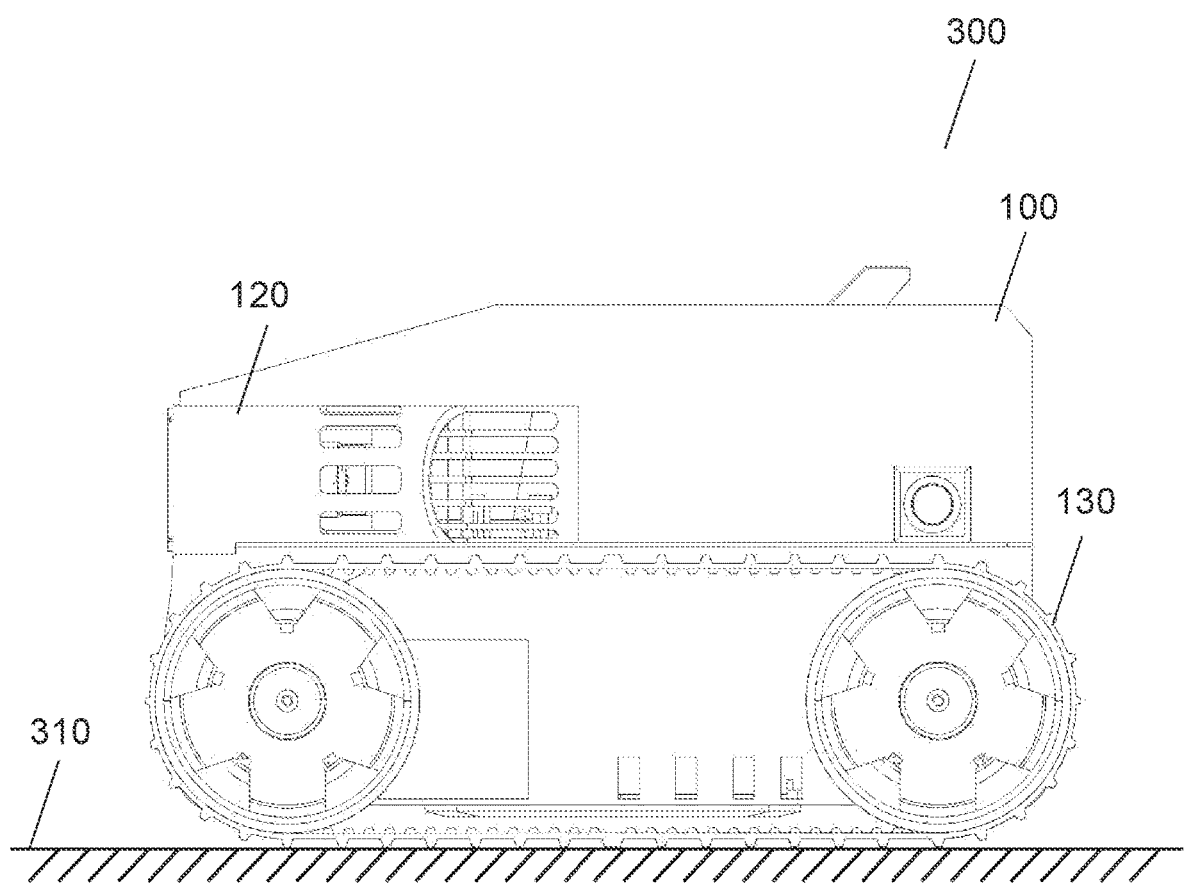
FIG. 6A is a schematic diagram illustrating another exemplary moving device used in liquid that is moving on a bottom wall of a target region according to some embodiments of the present disclosure.

The track 130 may drive the moving device 100 in the horizontal direction. As shown in FIG. 6A, when the moving device 100 is located on the bottom wall 310 of the target region 300, the operation of the track 130 may drive the moving device 100 on the bottom wall 310.

Figure 6B:
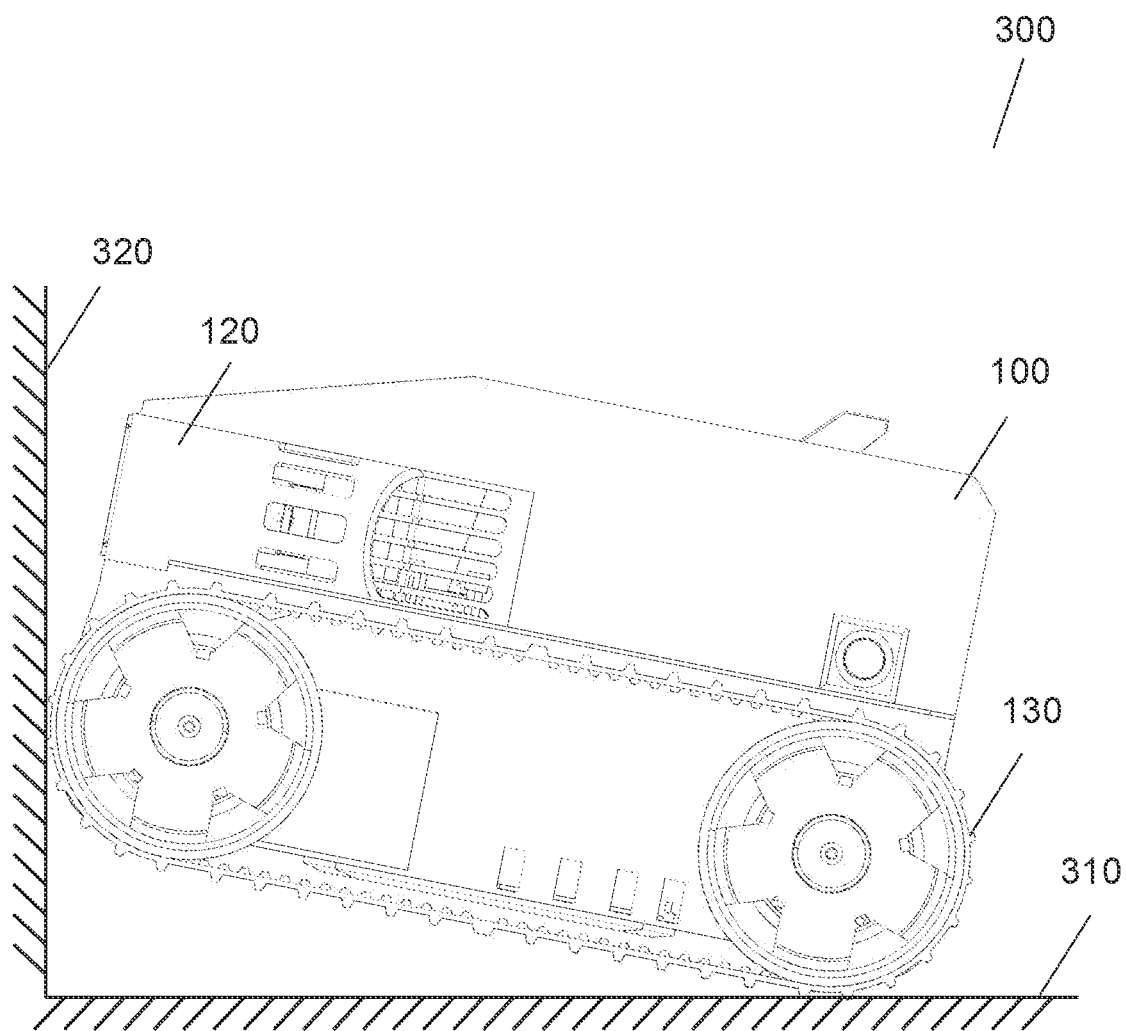
FIG. 6B is a schematic diagram illustrating another exemplary moving device used in liquid that is simultaneously moving on a bottom wall and a side wall of a target region according to some embodiments of the present disclosure.
Figure 6C:
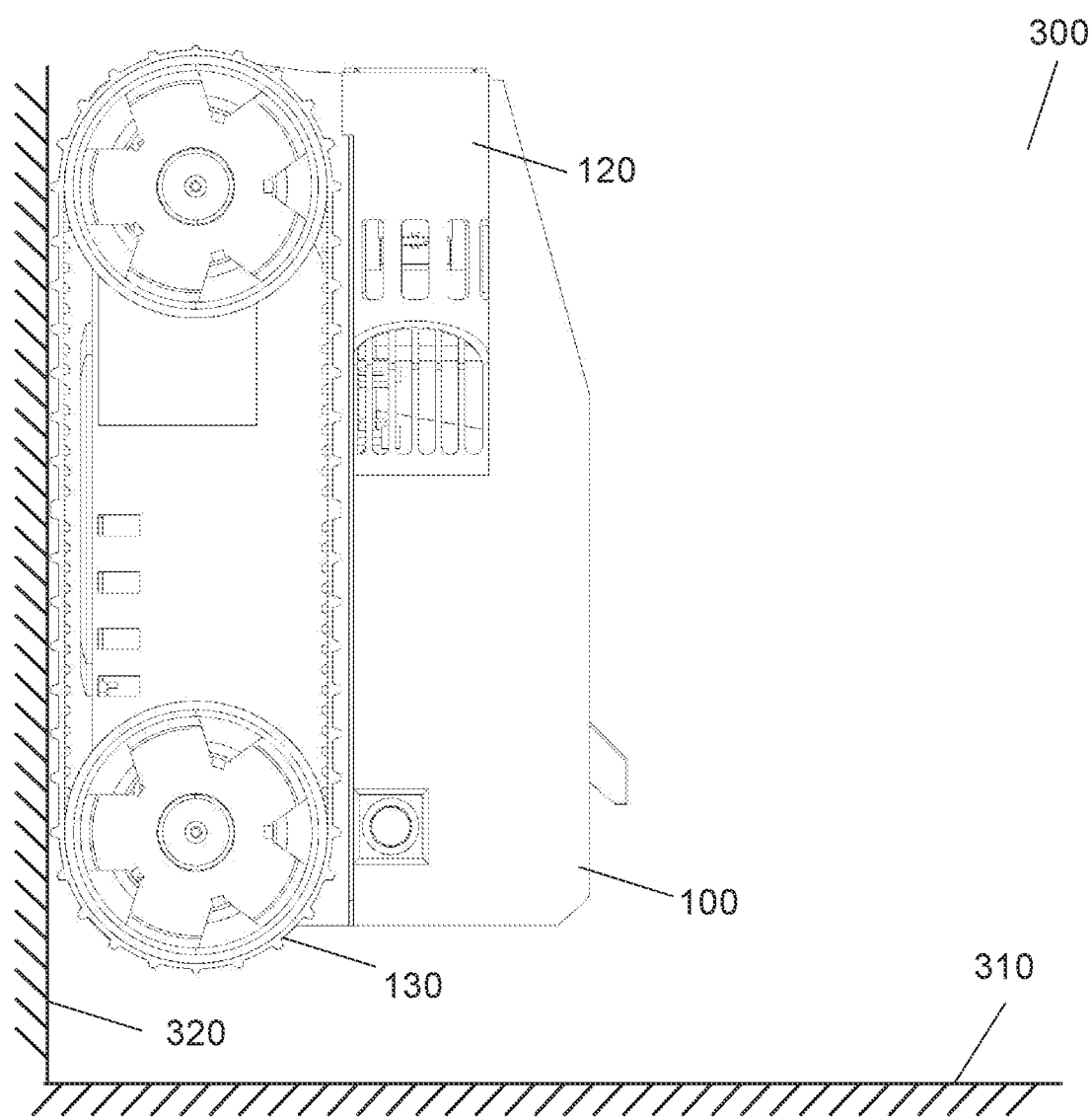
FIG. 6C is a schematic diagram illustrating another exemplary moving device used in liquid that is moving on a side wall of a target region according to some embodiments of the present disclosure.

The track 130 may also drive the moving device 100 in the vertical direction. As shown in FIGS. 4A and 6C, the operation of the track 130 also drives the moving device 100 on the side wall 320 of the target region 300 when the moving device 100 is pressed against the side wall 320. For more information about how the moving device 100 is achieved by pressing against the side wall 320 of the target region 300, please refer to the following part of the present disclosure.

In some embodiments, the track 130 may also enable a transition of a moving region of the moving device 100 from the bottom wall 310 to the side wall 320. As shown in FIG. 6B, when the track 130 moves to a point where the bottom wall 310 meets the side wall 320, a portion of the track 130 moves on the side wall 320 and a portion moves on the bottom wall 310. A portion of the track 130 at the side wall 320 may drive the moving device 100 upward until the moving region of the moving device 100 transitions from the bottom wall 310 to the side wall 320. When the moving region of the moving device 100 is converted from the bottom wall 310 to the side wall 320, the moving device 100 may move on the side wall 320 driven by the track 130, the moving device 100 may also move on the side wall 320 under the action of the second drive force provided by the second propeller 120 after steering, and the moving device 100 may also move on the side wall 320 based on the action of a third drive force provided by a main water pump 140. For more information about the main water pump 140 and the third drive force, please refer to the following part of the present disclosure.

Some embodiments of the present disclosure can facilitate the movement of the moving device 100 in various positions in the liquid by providing the track 130 and enable the transition of the moving region of the moving device 100 from the bottom wall 310 to the side wall 320.

In some embodiments, the moving device 100 may also include the main water pump 140. The main water pump 140 may be configured to drive the moving device 100 to absorb the liquid from a water inlet and discharge it from a water outlet. The water inlet may include one or more inlets for the liquid to enter the moving device 100. As shown in FIG. 5, FIG. 7A, FIG. 7B, and FIG. 8, the main water pump inlet 141 in the moving device 100 may serve as an inlet (i.e., a water inlet) for the liquid to enter the inside of the moving device 100. The water outlet may include one or more outlets in the moving device 100 where the liquid leaves the moving device 100 and enters the target region 300. As shown in FIG. 5, FIG. 7A, FIG. 7B, and FIG. 8, the main water pump outlet 142 in the moving device 100 may serve as an outlet (i.e., a water outlet) for the liquid in the moving device 100 to leave the moving device 100 and enter the target region 300.

Similar to the first propeller 112, the main water pump 140 may also include an impeller with a motor assembly, and the impeller may be driven by the motor assembly to rotate, to absorb the liquid in the target region 300 from the water inlet and discharge the liquid in the moving device 100 to the target region 300 through the water outlet. In some embodiments, the moving device 100 may switch the function of the main water pump inlet 141 and the main water pump outlet 142 by adjusting a rotation direction of the impeller in the main water pump 140. For example, when the impeller in the main water pump 140 is counter-rotating, the main water pump inlet 141 may be configured for the liquid to discharge and the main water pump outlet 142 may be configured for the liquid to enter.

In some embodiments, when the moving device 100 is located on the side wall 320, the water outlet (e.g., the main pump outlet 142) may be oriented at least within the target region 300 and parallel to a horizontal direction or with a downward slope in a vertical direction, thereby guaranteeing that when the main water pump 140 is in operation and the liquid is discharged from the main pump outlet 142, the moving device 100 may receive the third drive force to drive the moving device 100 to press against the side wall 320. The third drive force may include a reaction force obtained by the moving device 100 when the main water pump 140 discharges the liquid from the main water pump outlet 142. When the main pump outlet 142 is oriented inside the target region 300 and parallel to the horizontal direction, the third drive force obtained by the moving device 100 is oriented vertically towards the side wall 320, so that the moving device 100 may be made to press against the side wall 320. In some embodiments, when the moving device 100 needs to move on the side wall 320, the main water pump outlet 142 may be directed within the target region 300. When there is a downward slope in the vertical direction, on the one hand, the third drive force obtained by the moving device 100 may exist a component force in the horizontal direction towards the side wall 320, which may cause the moving device 100 to press against the side wall 320; on the other hand, the aforementioned third drive force may also exist a component force in the vertical direction with an upward division force, thereby also allowing the moving device 100 to move upwardly along the side wall 320. When the moving device 100 is located on the bottom wall 310, the third drive force obtained by the main water pump 140 discharging through the aforementioned main water pump outlet 142 may also exist a component force in the horizontal direction, thereby also allowing the moving device 100 to move on the bottom wall 310.

In some embodiments, the main water pump inlet 141 may be provided at the bottom of the moving device 100. When the moving device 100 needs to move on the side wall 320, the main water pump 140 may absorb the liquid from the main water pump inlet 141 to obtain a fourth drive force to drive the moving device 100 to press against the side wall 320. The fourth drive force may include an absorption force generated by the main water pump 140 from the main water pump inlet 141, and the aforementioned absorption force may drive the moving device 100 to press against the side wall 320.

In some embodiments, when the moving device 100 needs to move on the side wall 320, the main water pump 140 in the moving device 100 may drive the moving device 100 to press against the side wall 320. At least one of the track 130, the second propeller 120, and the main water pump 140 in the moving device 100 may provide a driving force upward in the vertical direction to drive the moving device 100 move upward on the side wall, and at least one of the track 130 and the second propeller 120 may provide a driving force downward in the vertical direction to drive the moving device 100 to move downward on the side wall.

Some embodiments of the present disclosure can make the moving device 100 presses against the side wall 320 by providing the main water pump 140, thus limiting the moving device 100, facilitating the moving of the moving device 100 on the side wall 320, and completing the position change of the moving device 100 from below the liquid surface to above the liquid surface.

It should be noted that the above description of the moving device 100 and its individual components is for descriptive convenience only and does not limit the present disclosure to the scope of the embodiments cited. It can be understood that it is possible for those skilled in the art, with an understanding of the principle of the device, to make any combination of the individual members or to form subcomponents to connect to other members without departing from this principle.

Figure 8:
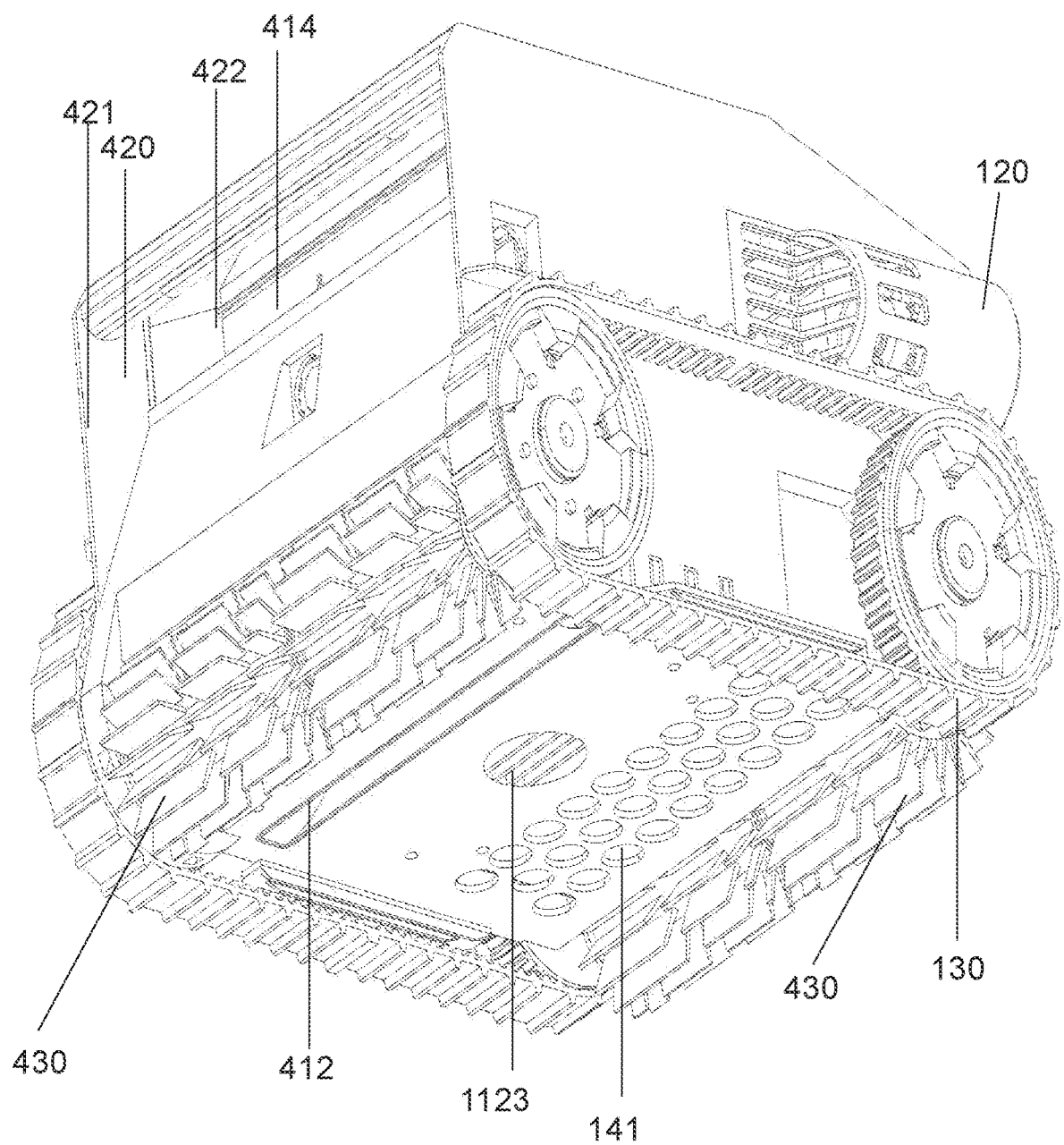
FIG. 8 is a schematic diagram illustrating an exemplary pool cleaning robot according to some embodiments of the present disclosure.

FIG. 8 is a schematic diagram illustrating a pool cleaning robot according to some embodiments of the present disclosure.

The pool cleaning robot 400 may be configured to clean the pool. In some embodiments, the pool cleaning robot 400 may include a moving device 100, a dust box 410, and a control member. The dust box 410 may be configured for a water surface cleaning and an in-water cleaning of the pool. The control member in the aforementioned pool cleaning robot 400 controls the moving device 100 to switch positions in the water surface of the pool and underwater to achieve the water surface cleaning or underwater cleaning.

Figure 9:
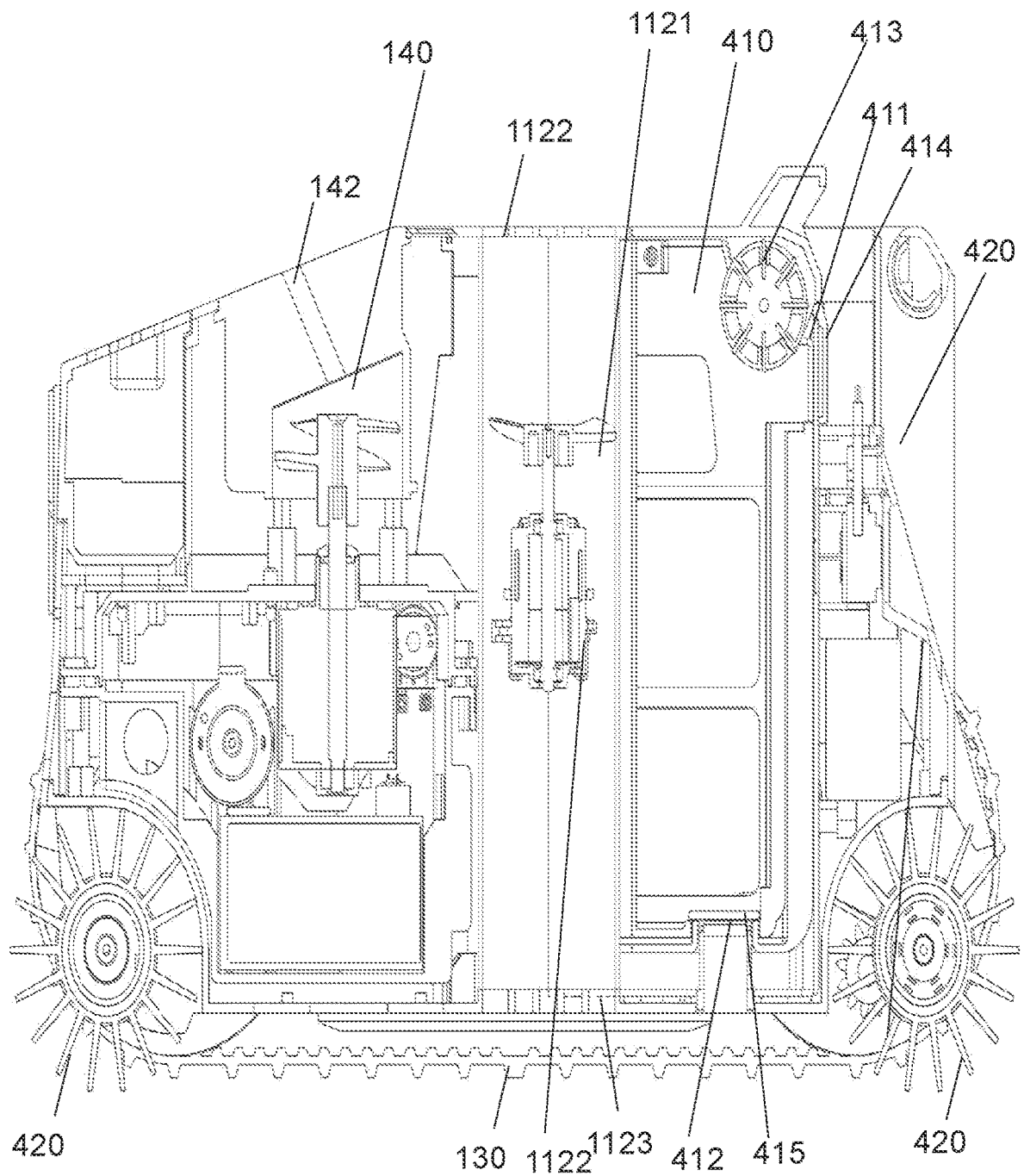
FIG. 9 is a schematic diagram illustrating a cross-sectional view of an exemplary pool cleaning robot according to some embodiments of the present disclosure.

As shown in FIGS. 8 and 9, the dust box 410 may include one or more dust box openings. The dust box opening may be configured for an entrance of trash or other impurities from the pool into the pool cleaning robot 400.

In some embodiments, the dust box opening may include a water surface dust box opening 411. The water surface dust box opening 411 may be configured as an entrance for the trash or impurities from the pool water surface to enter the dust box 410. The water surface dust box opening 411 may be provided on a side (e.g., front side) of the pool cleaning robot 400 and contain a floating position of the pool cleaning robot 400 when the pool cleaning robot 400 floats on the water surface, so that the trash or other impurities on the pool water surface may pass through the water surface dust box opening 411 into the dust box 410 with the liquid. For example, the floating position of the pool cleaning robot 400 while the pool cleaning robot 400 floats on the water surface may be located at a midline position or a ⅓ position of the water surface dust box opening 411.

In some embodiments, the dust box opening may also include a in-water dust box opening 412. The in-water dust box opening 412 may be configured as an entrance for the trash or impurities in the pool water to enter the dust box 410. The in-water dust box opening 412 may be provided below the floating position of the pool cleaning robot 400 at the water surface. For example, the in-water dust box opening 412 may be provided on a bottom of the pool cleaning robot 400. As another example, the in-water dust box opening 412 may also be provided on a side edge of the pool cleaning robot 400 below the floating position on the water surface.

Some embodiments of the present disclosure extend the use scenarios of the pool cleaning robot 400 and enhance the user experience by providing the water surface dust box opening 411 and the in-water dust box opening 412 to enable the pool cleaning robot 400 to perform the water surface cleaning and the in-water cleaning.

Figure 7B:
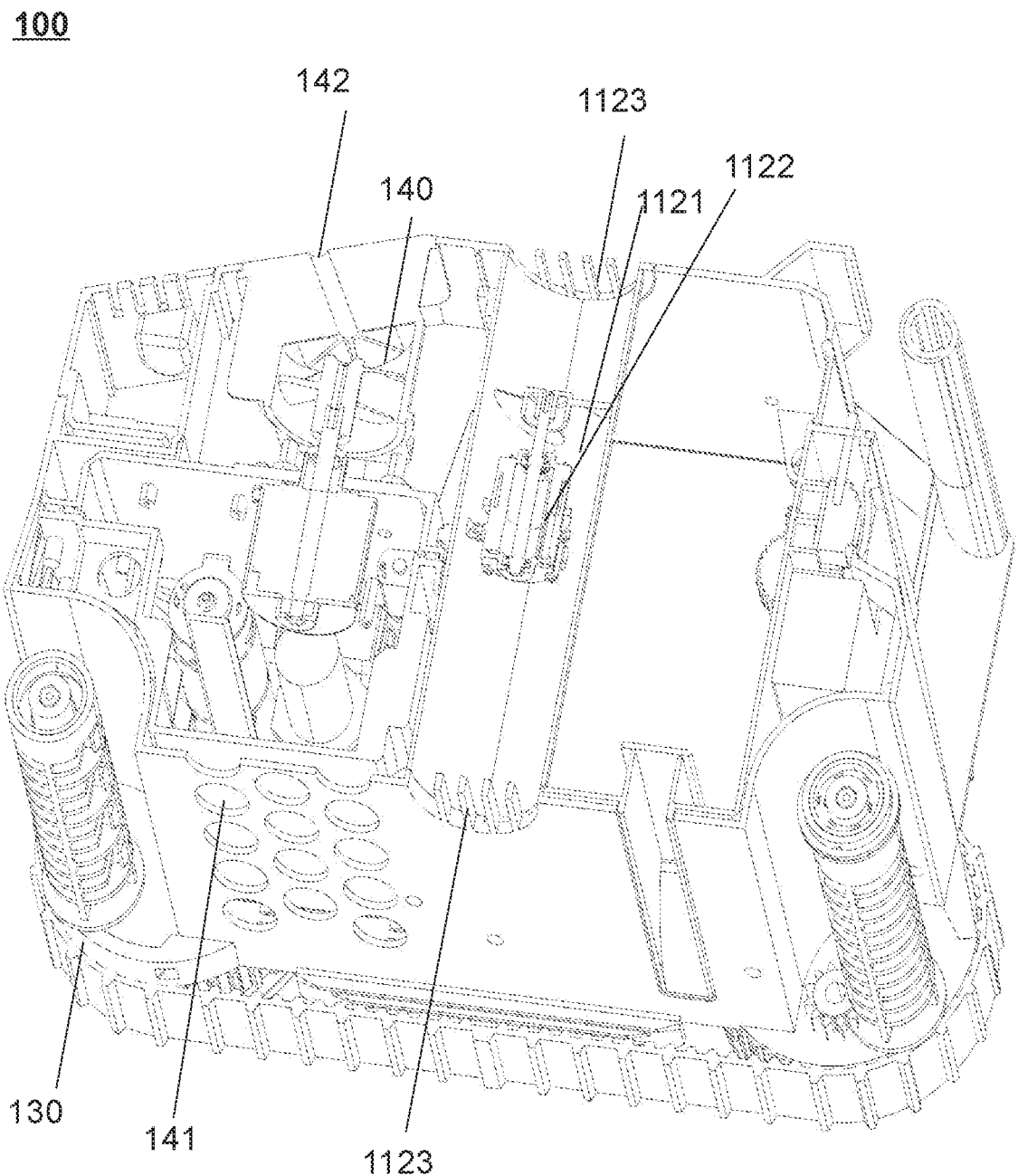
FIG. 7B is a schematic diagram illustrating a cross-sectional schematic view of another exemplary moving device used in liquid according to some embodiments of the present disclosure.

The dust box 410 may also include a dust box roller brush assembly 413. The dust box 410 may include one or more dust box roller brush assemblies 413. The dust box roller brush assembly 413 may be configured to improve the efficiency of the water surface cleaning by entraining the trash or impurities from the water surface into the dust box 410 when performing pool water surface cleaning. The dust box roller brush assembly 413 may be provided in the water surface dust box opening 411. As shown in FIG. 7B, the dust box roller brush assembly 413 may be provided on an inside of the water surface dust box opening 411. In some embodiments, the dust box roller brush assembly 413 may also be provided outside of or on the water surface dust box opening 411.

In some embodiments, the dust box 410 may also include a cover plate 414 of the water surface dust box opening and a cover plate 415 of the in-water dust box opening. The cover plate 414 of the water surface dust box opening is configured to adjust an opening and closing state of the water surface dust box opening 411. When the water surface dust box opening 411 is open, the liquid on the water surface of the pool may enter the dust box 410 through the water surface dust box opening 411; when the water surface dust box opening 411 is closed, the liquid on the pool water cannot enter the dust box 410 through the water surface dust box opening 411. The cover plate 414 of the water surface dust box opening is provided on the water surface dust box opening 411. As shown in FIG. 9, the cover plate 414 of the water surface dust box opening may be provided in the water surface dust box opening 411. The cover plate 414 of the water surface dust box opening may also be provided on the inside of the water surface dust box opening 411, or on the outside of the water surface dust box opening 411. Similar to the cover plate 414 of the water dust box opening, the cover plate 415 of the in-water dust box opening is configured to adjust an opening and closing state of the in-water dust box opening 412. The cover plate 415 of the in-water dust box opening is provided on the in-water dust box opening 412. The cover plate 415 of the in-water dust box opening is provided in the in-water dust box opening 412, on an inside of the in-water dust box opening 412, or on an outside of the in-water dust box opening 412.

The cover plate 414 of the water surface dust box opening and the cover plate 415 of the in-water dust box opening may be movable members. The control member may allow the corresponding dust box opening or closing by adjusting the water dust box opening cover 414 and/or the in-water dust box opening cover 415. For example, the water surface dust box opening cover 414 may be a rotatable member, and the control member may convert the water surface dust box opening 411 from a closing state to an opening state by rotation of the water surface dust box opening cover 414.

In some embodiments, when the pool cleaning robot 400 needs to perform the underwater cleaning, the control member may keep the surface dust box mouth 411 closed through the cover plate 414 of the water dust box opening and keep the in-water dust box opening 412 open through the cover plate 415 of the in-water dust box opening, which avoids the diversion of liquid by the water surface dust box opening 411 and ensures the absorption of the in-water dust box opening 412, thereby improving the cleaning efficiency of the pool cleaning robot 400 in the water.

In some embodiments, the dust box 410 may also include other structures. For example, the dust box 410 may also include a filter. The aforementioned filter may be configured to filter the liquid entering the dust box 410.

The control member may be configured to control the pool cleaning robot 400 for the water surface cleaning or underwater cleaning of the pool. In some embodiments, the control member may obtain a target task for cleaning a target pool, the target task including a water surface cleaning and an underwater cleaning; determine an adjustment parameter of the moving device 100 based on the target task and a current position of the pool cleaning robot 400; control the moving device 100 to move, based on the adjustment parameter, the pool cleaning robot 400 to a target position to complete the target task. For more information about the above embodiments, please refer to FIG. 10 and its related description.

Some embodiments of the present disclosure ensure a comprehensive pool cleaning by providing the pool cleaning robot 400 with the moving device 100 to clean the pool in multiple positions such as the bottom, the water, and the surface of the pool in an all-round manner.

In some embodiments, the pool cleaning robot 400 may also include a trash guiding member 420. The trash guiding member 420 may drive the trash in the liquid surface of the pool into the water surface dust box opening 411. As shown in FIG. 8 and FIG. 9, the trash guiding member 420 may be located on an outside of the water surface dust box opening 411 and be hollow inside. The trash guiding member 420 may be with a size of a first end 421 away from the water surface dust box opening 411 that is larger than a size of the water surface dust box opening 411, and a size of a second end 422 connected to the water surface dust box opening 411 that is not smaller than the size of the water surface dust box opening 411. The trash guiding member 420 may include, but is not limited to, structures such as a truncated cone, a trapezoid, etc., whose interior are hollow.

In some embodiments, the size of the first end 421 may be provided in proportion to the water surface dust box opening 411. For example, a size ratio of the first end 421 to the water surface dust box opening 411 may be set no more than 10:1 to avoid too much trash or impurities entering the water surface dust box opening 411 at the same time to cause the water surface dust box opening 411 to clog.

Some embodiments of the present disclosure, by providing the trash guiding member 420, can collect the trash on the wider water surface to enter the water surface dust box opening 411, which avoids reducing the efficiency of the water surface cleaning of the pool cleaning robot 400 caused by the water surface dust box opening 411 being too small.

As shown in FIGS. 8 and 9, the pool cleaning robot 400 may also include a main roller brush 430. The main roller brush 430 may be configured to clean the bottom wall 310 and the side wall 320 of the pool. The pool cleaning robot 400 may include one or more main roller brushes 430. The main roller brush 430 may be provided on the bottom and/or side of the pool cleaning robot 400. As shown in FIG. 8, the pool cleaning robot 400 may be provided with one main roller brush 430 at each of a front and rear end of the bottom of the pool cleaning robot 400. When the pool cleaning robot 400 moves across the bottom of the pool, the main roller brush 430 may clean the bottom of the pool (e.g., sweep for impurities or algae); when the pool cleaning robot 400 moves over the walls of the pool, the main roller brush 430 may also clean the walls of the pool.

It should be noted that the above description of the pool cleaning robot 400 and its individual components is for descriptive convenience only and does not limit the present disclosure to the scope of the embodiments cited. It can be understood that it is possible for those skilled in the art, with an understanding of the principle of the device, to make any combination of the individual members or to form subcomponents to connect to other members without departing from this principle.

Figure 10:
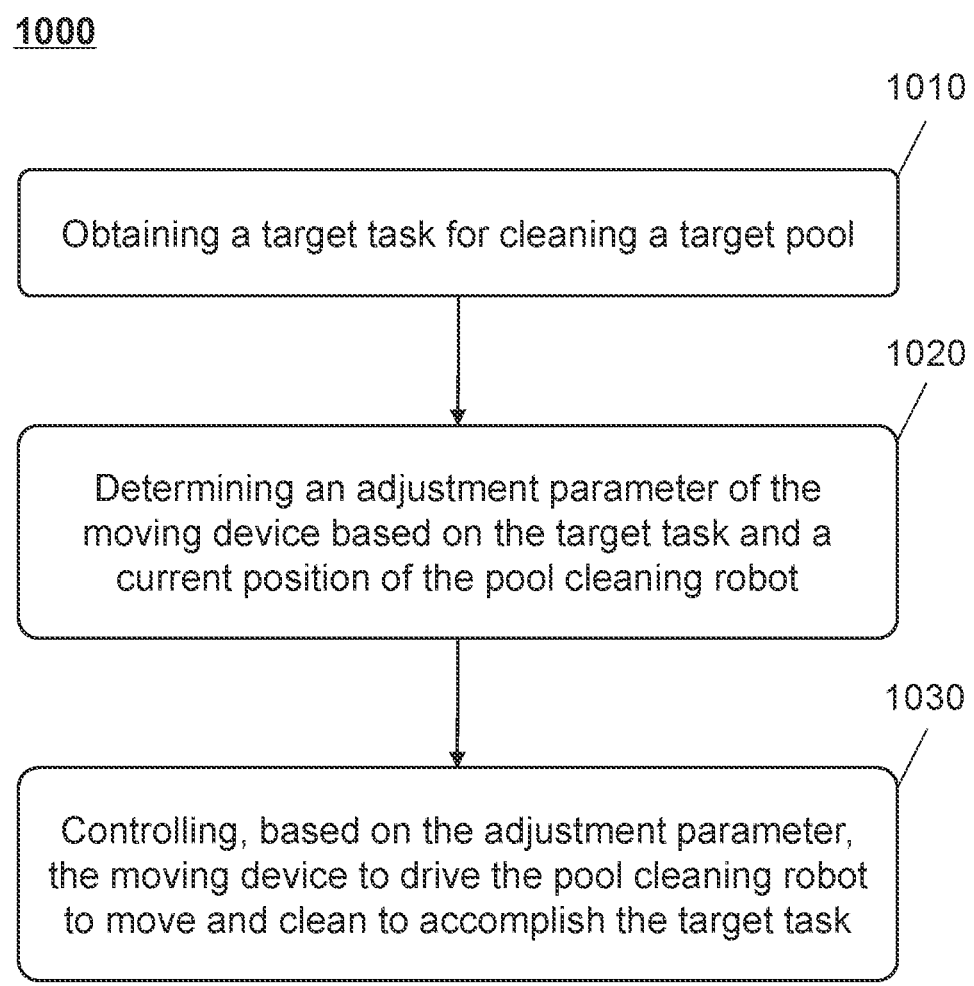
FIG. 10 is a flowchart illustrating an exemplary process for liquid cleaning control according to some embodiments of the present disclosure.

FIG. 10 is a flowchart illustrating an exemplary liquid cleaning control method according to some embodiments of the present disclosure. The process 1000 may be applied to the pool cleaning robot 400 and executed by the control member. As shown in FIG. 10, the process 1000 may include the following steps.

In 1010, a target task for cleaning a target pool may be obtained.

The target pool may be a pool that needs to be cleaned. The target task may be a cleaning task that needs to be performed on the target pool. The target task may include a water surface cleaning and/or an underwater cleaning. The water surface cleaning may refer to cleaning the water surface of the target pool, and the underwater cleaning may refer to cleaning the underwater (e.g., the water body, the walls of the pool, etc.) of the target pool. In some embodiments, the target task may also include a specific cleaning site. For example, the underwater cleaning may also include, but is not limited to, a water body cleaning, a pool bottom cleaning, an individual pool wall cleaning, etc.

The control member may obtain the target task in a variety of ways. For example, the control member may obtain a target task input by a user. As another example, the control member can be set to perform the target task at regular intervals, e.g., once every 3 days for the water surface cleaning and once every 2 days for the underwater cleaning. As another example, the pool cleaning robot 400 may also include a detection member, and the aforementioned detection member may test the water quality of the target pool and obtain water quality data of the target pool. The control member may obtain the aforementioned water quality data, and determine the target task based on the water quality data. The water quality data may be data that reflect a water quality condition of the target pool. The water quality data includes, but is not limited to, a picture of the water surface of the target pool, a picture of the water, a picture of the individual pool walls, etc. The control member may input the water quality data into a task determination model, and an output of the task determination model may include the target task. The task determination model may analyze the water quality data of the target pool to determine the cleanliness (e.g., clarity, algae distribution, impurities, etc.) of each region (e.g., water surface, water, individual pool walls, etc.) and thus determine the corresponding target task. The task determination model may include a convolutional neural network model, a graph neural network, or any other machine learning model that can implement this function. The task determination model may be obtained by training based on multiple sets of training samples with labels. The training samples may include sample water quality data from a sample pool, and the labels may include a sample task. The sample task may be obtained by manually labeling the sample water quality data.

In 1020, an adjustment parameter of the moving device may be determined based on the target task and a current position of the pool cleaning robot.

The control member may obtain the current position of the pool cleaning robot 400, and for more information about obtaining the current position of the pool cleaning robot 400, please refer to the first sensor above in the present disclosure.

The adjustment parameter may include route information for moving from the current position to a position of the target pool where the target task needs to be performed and route information required to complete the target task.

The control member may determine a starting position in the target pool where the target task needs to be performed based on the target task, determine the route information for the pool cleaning robot 400 to move from the current position to the position of the target pool where the target task needs to be performed based on the aforementioned starting position and the current position, and then determine the route information required to complete the target task based on the target task of the target pool, thereby determining the adjustment parameter of the moving device 100.

In 1030, the moving device may be controlled, based on the adjustment parameter, to drive the pool cleaning robot to move and clean to accomplish the target task.

The control member may control the moving device 100 to drive the pool cleaning robot 400 to move from the current position to the starting position where the target task needs to be performed based on the route information in the adjustment parameter for moving from the current position to the position of the target pool where the target task needs to be performed, and then open the dust box 410 in the pool cleaning robot 400 and the main roller brush 430 for cleaning to complete the target task based on the route information in the adjustment parameter, thereby completing the target task. The pool cleaning robot 400 may stay at an ending position, return to the starting position before moving, or a preset default position after completing the target task.

Some embodiments of the present disclosure enable control of the pool cleaning robot 400 to clean all parts of the pool through the aforementioned liquid cleaning control method to improve pool cleaning efficiency while ensuring the comprehensive pool cleaning.

It should be noted that the above description of the process 1000 is merely provided for the purpose of illustration, and is not intended to limit the scope of the present disclosure. For those skilled in the art, various amendments and changes can be made to the process 1000 under the guidance of the present disclosure. However, these modifications and changes are still within the scope of the present disclosure.

Some embodiments of the present disclosure also provide a non-transitory computer-readable storage medium. The storage medium may include a set of instructions. When the set of instructions are executed by a processor, a liquid cleaning control method as described above is implemented.

The basic concept has been described above. Obviously, for the technicians of the arts, the above-mentioned detailed disclosure is only used as an example, and it does not constitute a limitation of the present disclosure. Although not explicitly described herein, various modifications, improvements, and corrections to the present disclosure may occur to those skilled in the art. The amendments, improvements, and amendments are recommended in the present disclosure, so the amendments, improvements, and amendments of this class still belong to the spirit and scope of the demonstration embodiments of the present disclosure.

Meanwhile, the present disclosure uses specific words to describe the embodiments of the present disclosure. For example, "one embodiment," "an embodiment," and/or "some embodiments" mean that a certain feature, structure, or characteristic is connected with at least one embodiment of the present disclosure. Therefore, it should be emphasized and noted that two or more references of "an embodiment" or "one embodiment" or "an alternative embodiment" in various places in the present disclosure do not necessarily refer to the same embodiment. Further, certain features, structures, or features of one or more embodiments of the present disclosure may be combined.

Furthermore, unless expressly stated in the claims, the order or elements and sequences of treatment, the use of alphanumeric numbers, or other names described in this description shall not be configured to define the order of processes and methods in the present disclosure Although the above disclosure discusses through various examples what is currently considered to be a variety of useful embodiments of the disclosure, it is to be understood that such detail is solely for that purpose of description and that the appended claims are not limited to the disclosed embodiments, on the contrary, are intended to cover modifications and equivalent combination s that are within the spirit and scope of the embodiments of the present disclosure. For example, although the implementation of various components described above may be embodied in a hardware device, it may also be implemented as a software only solution, e.g., an installation on an existing server or mobile device.

Similarly, it should be noted that to simplify the expressions disclosed in the present disclosure and thus help the understanding of one or more embodiments of the invention, in the foregoing description of the embodiments of this specification, various features may sometimes be combined into one embodiment, drawings or descriptions thereof. However, this approach of disclosure does not imply that the features required by the present disclosure are more than the features recited in the claims. Rather, claimed subject matter may lie in less than all features of a single foregoing disclosed embodiment.

Some embodiments use numbers with description ingredients and attributes. It should be understood that the number described by such examples is used in some examples with the modified words "about," "approximate," or "generally" to modify. Unless stated otherwise, "about," "approximately," or "substantially" means that a variation of ±20% is allowed for the stated number. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. It should be noted that, if there is any inconsistency or conflict between the descriptions, definitions, and/or usage of terms in subsidiary information of the present disclosure and the contents of the present disclosure, the descriptions, definitions, and/or usage of terms in the present disclosure shall prevail.

Finally, it should be understood that the embodiments described in the present disclosure are only configured to illustrate the principles of the embodiments of the present disclosure. Other modifications that may be employed may be within the scope of the present disclosure. Therefore, as an example and not a limitation, alternative configurations of the embodiments of the present disclosure may be regarded as consistent with the teaching of the present disclosure. Correspondingly, the embodiments of the present disclosure are not limited to the embodiments clearly introduced and described in the present disclosure.

What is claimed is:

1. A moving device used in liquid, comprising:
a mode switching member configured to achieve a position switching of the moving device above a liquid surface and below the liquid surface, wherein when the moving device is below the liquid surface, the moving device is fully submerged below the liquid surface, and when the moving device is above the liquid surface, at least a portion of the moving device is above the liquid surface, wherein
an action force received by the moving device in a vertical direction includes a buoyancy force to which the moving device is subjected in the vertical direction, and the mode switching member includes: a buoyancy force adjustment assembly configured to adjust a magnitude of the buoyancy force to which the moving device is subjected in the vertical direction; or
the action force received by the moving device in the vertical direction includes a first drive force to which the moving device is subjected in the vertical direction, and the mode switching member includes: a power adjustment assembly configured to adjust the first drive force to which the moving device is subjected in the vertical direction.

2. The moving device of claim 1, wherein the buoyancy force adjustment assembly includes:
a buoyancy cavity configured to accommodate at least one of liquid or gas; and
a buoyancy force adjustment member configured to adjust a volume of the gas in the buoyancy cavity.

3. The moving device of claim 2, further comprising:
a first sensor configured to sense a position of the moving device; and
a processor configured to:
obtain the position of the moving device when the moving device needs to be switched from under the liquid surface to above the liquid surface; and
control the buoyancy force adjustment member to increase the volume of the gas in the buoyancy cavity when the position of the moving device meets a preset condition.

4. The moving device of claim 2, further comprising:
a second sensor configured to detect whether a position of an air inlet of the buoyancy cavity is located in air; and
a processor configured to:
obtain a detection result of whether the air inlet is located in air when the moving device needs to be switched from below the liquid surface to above the liquid surface; and
control the buoyancy force adjustment member to increase the volume of the gas in the buoyancy cavity when the detection result indicating that the air inlet is located in air.

5. The moving device of claim 1, further comprising a processor configured to:
control the buoyancy force adjustment member to reduce a volume of gas in the buoyancy cavity when the moving device needs to be switched from above the liquid surface to below the liquid surface.

6. The moving device of claim 1, wherein the power adjustment assembly includes:
a first propeller configured to propel the liquid to move along a first preset direction, the moving device being subjected to the first drive force in the vertical direction when the liquid moves along the first preset direction, wherein a magnitude of the first drive force is positively correlated with a speed of the liquid moving along the first preset direction.

7. The moving device of claim 6, wherein the first propeller includes:
an impeller configured to drive the liquid by rotation to move along the first preset direction, the moving device being subjected to the first drive force in the vertical direction when the liquid moves along the first preset direction; and
a motor assembly configured to power the impeller.

8. The moving device of claim 1, further comprising:
a second propeller configured to propel the liquid to move along a second preset direction, the moving device being subjected to a second drive force in a horizontal direction when the liquid moves along the second preset direction, wherein a magnitude of the second drive force is positively correlated with a speed of the liquid moving along the second preset direction.

9. The moving device of claim 1, wherein the moving device is configured to move in a target region including the liquid, the target region including a bottom wall and a side wall, and the moving device further including:
a track configured to drive the moving device to move and realize a transition of a moving region from the bottom wall to the side wall.

10. The moving device of claim 1, further comprising:
a main water pump configured to drive the moving device to absorb the liquid from a water inlet and discharge the liquid from a water outlet.

11. The moving device of claim 10, wherein the moving device is configured to move in a target region including the liquid, wherein the target region includes a bottom wall and a side wall, the water outlet includes a main water pump outlet, the main water pump outlet is oriented within the target region when the moving device is located on the side wall and parallel to the horizontal direction or has a downward slope in the vertical direction, and when the moving device needs to move on the side wall, the main water pump is also configured to:
discharge the liquid from the main water pump outlet, thus obtaining a third drive force to drive the moving device tightly against the side wall; or
the water inlet includes a main water pump inlet, the main water pump inlet is provided at a bottom of the moving device, and when the moving device needs to move on the side wall, the main water pump is further configured to:
absorb the liquid from the main pump inlet, thereby obtaining a fourth drive force to drive the moving device tightly against the side wall.

12. A pool cleaning robot, comprising:
a dust box including a dust box opening configured to clean liquid that enters the dust box;
a moving device including a mode switching member configured to achieve a position switching of the moving device above a liquid surface and below the liquid surface, wherein when the moving device is below the liquid surface, the moving device is fully submerged below the liquid surface, and when the moving device is above the liquid surface, at least a portion of the moving device is above the liquid surface, wherein
an action force received by the moving device in a vertical direction includes a buoyancy force to which the moving device is subjected in the vertical direction, and the mode switching member includes: a buoyancy force adjustment assembly configured to adjust a magnitude of the buoyancy force to which the moving device is subjected in the vertical direction; or
the action force received by the moving device in the vertical direction includes a first drive force to which the moving device is subjected in the vertical direction, and the mode switching member includes: a power adjustment assembly configured to adjust the first drive force to which the moving device is subjected in the vertical direction;
a control member configured to control the pool cleaning robot to perform a water surface cleaning of a pool or an underwater cleaning of the pool.

13. The pool cleaning robot of claim 12, wherein the dust box opening includes:
a water surface dust box opening, provided on a side of the pool cleaning robot, including a floating position of the pool cleaning robot, and configured as an entrance of trash or impurities on a pool surface entering to the dust box.

14. The pool cleaning robot of claim 13, wherein the dust box includes:
a dust box roller brush assembly, provided in the surface dust box opening, and configured to roll the trash or impurities from the pool surface into the dust box when the surface cleaning is performed.

15. The pool cleaning robot of claim 13, wherein the dust box opening includes:

an in-water dust box opening, provided below the floating position of the pool cleaning robot on the water surface, and configured as an entrance of trash or impurities in pool water entering to the dust box.

16. The pool cleaning robot of claim 15, wherein the dust box further includes:
a cover plate of the water surface dust box opening, provided on the water surface dust box opening, and including a movable part configured to adjust an opening state of the water surface dust box opening and a closing state of the water surface dust box opening;
a cover plate of the in-water dust box opening, provided on the in-water dust box opening and including a movable part configured to adjust an opening state of the in-water dust box opening and a closing state of the in-water dust box opening.

17. The pool cleaning robot of claim 16, further comprising:
a trash guiding member configured to drive the trash in a water surface of the pool into the water surface dust box opening, the trash guiding member being located on an outside of the water surface dust box opening and being hollow inside, a size of a first end of the trash guiding member away from the water surface dust box opening being larger than a size of the water surface dust box opening, and a size of a second end of the trash guiding member connected to the water surface dust box opening being not smaller than the size of the water surface dust box opening.

18. The moving device of claim 8, wherein the moving device is provided with at least one second propeller on each of a left side and a right side in the horizontal direction.

19. The pool cleaning robot of claim 12, further including:
a main roller brush, provided on a bottom of the pool cleaning robot or a side of the pool cleaning robot, and configured to clean a bottom wall of the pool and a side wall of the pool.

20. A liquid cleaning control method, applied to a pool cleaning robot, and performed by a control member, wherein the pool cleaning robot comprises:
a dust box including a dust box opening configured to clean liquid that enters the dust box;
a moving device including a mode switching member configured to achieve a position switching of the moving device above a liquid surface and below the liquid surface, wherein when the moving device is below the liquid surface, the moving device is fully submerged below the liquid surface, and when the moving device is above the liquid surface, at least a portion of the moving device is above the liquid surface, wherein
an action force received by the moving device in a vertical direction includes a buoyancy force to which the moving device is subjected in the vertical direction, and the mode switching member includes: a buoyancy force adjustment assembly configured to adjust a magnitude of the buoyancy force to which the moving device is subjected in the vertical direction; or
the action force received by the moving device in the vertical direction includes a first drive force to which the moving device is subjected in the vertical direction, and the mode switching member includes: a power adjustment assembly configured to adjust the first drive force to which the moving device is subjected in the vertical direction;

the control member configured to control the pool cleaning robot to perform a water surface cleaning of a pool or an underwater cleaning of the pool;

the liquid cleaning control method comprising:

obtaining a target task for cleaning a target pool, wherein the target task includes the water surface cleaning of the pool or the underwater cleaning of the pool;

determining an adjustment parameter of the moving device based on the target task and a current position of the pool cleaning robot; and controlling, based on the adjustment parameter, the moving device to drive the pool cleaning robot to move and clean to accomplish the target task.

* * * * *